(12) United States Patent
Yoshida et al.

(10) Patent No.: US 7,446,946 B2
(45) Date of Patent: Nov. 4, 2008

(54) ZOOM OPTICAL SYSTEM

(75) Inventors: Hirofumi Yoshida, Yokohama (JP);
Koshi Hatakeyama, Kita-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 11/426,587

(22) Filed: Jun. 27, 2006

(65) Prior Publication Data

US 2006/0291513 A1 Dec. 28, 2006

(30) Foreign Application Priority Data

Jun. 27, 2005 (JP) ............................. 2005-186982
Jun. 27, 2005 (JP) ............................. 2005-186983

(51) Int. Cl.
*G02B 15/14* (2006.01)
*G02B 15/02* (2006.01)

(52) U.S. Cl. .................. 359/676; 359/672; 359/689

(58) Field of Classification Search ......... 359/672–676, 359/689
See application file for complete search history.

(56) References Cited

U.S. PATENT DOCUMENTS 3,305,294 A 2/1967 Alvarez
3,583,790 A 6/1971 Baker
6,850,372 B1* 2/2005 Stenton ...................... 359/676

FOREIGN PATENT DOCUMENTS

JP 02-119103 A 5/1990

OTHER PUBLICATIONS

Keisuke Araki, "Paraxial Analysis for Off-Axial Optical Systems", Japanese Journal of Optics, vol. 29, No. 3, 2000.

* cited by examiner

*Primary Examiner*—William C Choi
(74) *Attorney, Agent, or Firm*—Canon U.S.A., Inc. I.P. Division

(57) ABSTRACT

At least one exemplary embodiment is directed to a zoom optical system which includes a plurality of optical groups with variable optical power arranged along an optical axis; and at least one optical group arranged along the optical axis, and where the system is zoomed by changing the power of at least one of the plurality of optical groups with variable optical power, where the plurality of the optical groups with variable optical power each includes a rotationally asymmetric surface and each has a plurality of optical devices, which change the power within the respective optical groups by moving the respective optical devices in a direction different from the optical axis, and the system at a telephoto end satisfies the condition: $|\phi dt| \leq |\phi st|$, where $|\phi dt|$ is the absolute value of the power total sum of a plurality of the optical groups with variable optical power, and $|\phi st|$ is the absolute value of the power total sum of the at least one optical group.

13 Claims, 25 Drawing Sheets

FIG. 23
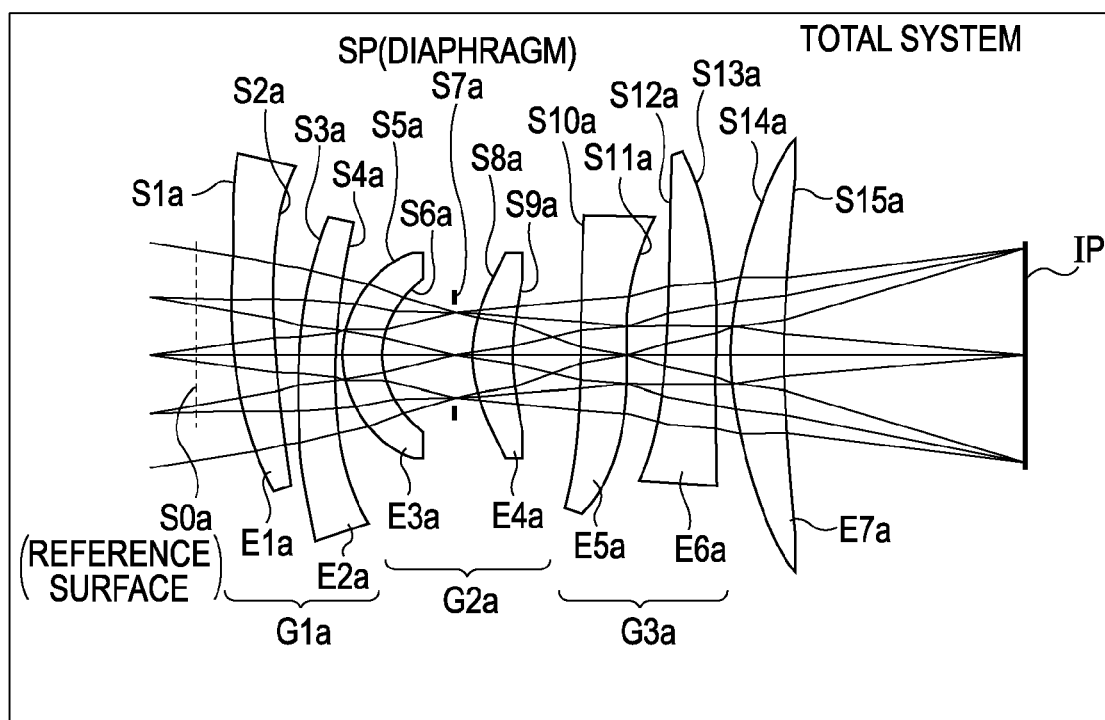
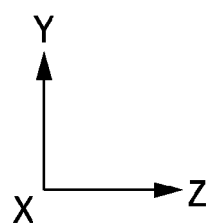

TELEPHOTO END

——————— 650 nm
- - - - - - - 550 nm
— · — · — 450 nm

MIDDLE

———— 650 nm
- - - - - 550 nm
— · — · — 450 nm

WIDE ANGLE END

——— 650 nm
- - - - - 550 nm
—·—·— 450 nm

| OBJECT FACE | EMBODIMENT BASED ON JAPANESE PATENT LAID-OPEN No. H02-119103 | FIRST EMBODIMENT |
|---|---|---|
| REFERENCE FACE S0 | 0 | 0 |
| S1 | 0.642857143 | 0.5 |
| S2 | 0.321428571 | 0.1 |
| S3 | 0.642857143 | 0.1 |
| S4 | 0.257142857 | 0 |
| DIAPHRAGM FACE S5 | 0.257142857 | 0 |
| S6 | 0.642857143 | 0.5 |
| S7 | 0.321428571 | 0.3 |
| S8 | 0.642857143 | 0.5 |
| S9 | 9.771428571 | 0.2 |
| S10 |  | 0.5 |
| S11 |  | 1.758954358 |
| S12 |  | 0.5 |
| S13 |  | 0.460489246 |
| S14 |  | 0.3 |
| S15 |  | 0.2 |
| S16 |  | 0.5 |
| IMAGE PLANE |  | TOTAL OF S9 TO S16: 4.42 |

ZOOM OPTICAL SYSTEM

BACKGROUND OF THE INVENTION

1. Field of the Invention

The present invention relates to a zoom optical system which can be used in various devices such as an image-pickup apparatus, a projector, an aligner, and a reader.

2. Description of the Related Art

Recently, along with the wide spread of digital cameras and mobile phones equipped with cameras, a compact and high-resolution zoom optical system has been demanded.

In a compact and high-resolution zoom optical system, the system is generally zoomed by moving a plurality of lens groups relative to a light-receiving plane (such as a CCD) in the optical axial direction. In a conventional zoom system in which lens groups are moved toward an object, the entire optical length (the distance between a first lens surface and an image plane) is increased, restricting the entire lens system from being miniaturized.

Whereas, an optical system has been discussed using an optical device called an Alvarez lens, the power of the entire system is changed by moving the optical device in a direction different from the optical axis (U.S. Pat. No. 3,305,294, U.S. Pat. No. 3,583,790, and "KOGAKU (Japanese Journal of Optics)" Vol. 29, No. 3 (2000)).

Various zoom optical systems are discussed for zooming with the Alvarez lens (Japanese Patent Laid-Open No. H02-119103).

In the optical system discussed in U.S. Pat. No. 3,305,294, the power is changed by relatively moving two lenses with curved surfaces expressed by a cubic function in a direction different from the optical axial direction. Since this optical system is not brought out in the optical axial direction, the entire lens length is reduced when used in a zoom optical system.

In the optical system discussed in U.S. Pat. No. 3,583,790, aberration is reduced by forming a lens in a curved surface expressed not only by the cubic function but also by the higher-order, for example the fifth-order function.

Furthermore, Japanese Patent Laid-Open No. H02-119103 discusses an example using this lens in a zoom optical system, and a principle that the power is changed by arranging at least two of the above lenses while the image point being maintained constant.

On the other hand, "KOGAKU (Japanese Journal of Optics)" Vol. 29, No. 3 (2000) describes an optical system including a rotationally asymmetrical optical device. This optical system has not a common axis (optical axis) differently from a general coaxial lens system. Such a non-coaxial optical system is called as an off-axial optical system that can be defined as an optical system including a curved surface (off-axial curved surface), in which when the optical path of the light passing through the image point and the pupil center is assumed as a reference axis, a normal of the surface at the intersecting point of the curved surface and the reference axis is not aligned with the reference axis.

Since the reference axis is bent in this case, the paraxial amount calculation has to use not a paraxial theory for a coaxial system but a paraxial theory based on an off-axial principle. The method is described in "KOGAKU (Japanese Journal of Optics)" Vol. 29, No. 3 (2000) in detail, which uses a 4×4 determinant on the basis of the radius of curvature of the surface, for example.

In U.S. Pat. Nos. 3,305,294 and 3,583,790, a method is described for changing the power and correcting the aberration using a pair of rotationally asymmetric lenses; however, the image plane cannot be maintained constant when the power is changed.

In Japanese Patent Laid-Open No. H02-119103, a principle is described for changing the power while maintaining the image pane constant; however, it has not yet led to a practical design for obtaining excellent images by correcting or reducing the aberration.

For configuring a zoom optical system using the Alvarez lens, it is useful that the image plane be maintained constant during zooming wile the change in aberration due to the zooming be reduced.

SUMMARY OF THE INVENTION

According to an aspect of the present invention, a zoom optical system includes a plurality of optical groups with variable optical power arranged along an optical axis and at least one optical group arranged along the optical axis, and the system is zoomed by changing the power of a plurality of the optical groups with variable optical power, where a plurality of the optical groups with variable optical power each includes a rotationally asymmetric surface and each can have a plurality of optical devices, which change the power within the respective optical groups by moving the respective optical devices in a direction different from the optical axis, and the system at a telephoto end can satisfy the condition:

$$|\phi dt| \leq |\phi st|,$$

where $|\phi dt|$ is the absolute value of the power total sum of a plurality of the optical groups with variable optical power, and $|\phi st|$ is the absolute value of the power total sum of the at least one optical group.

According to another aspect of the present invention, a zoom optical system includes a plurality of optical groups with variable optical power arranged along an optical axis; at least one optical group arranged along the optical axis; and a diaphragm arranged along the optical axis, in which the system is zoomed by changing the power of a plurality of the optical groups with variable optical power, where a plurality of the optical groups with variable optical power each includes a rotationally asymmetric surface and each can have a plurality of optical devices, which change the power within the respective optical groups by moving the respective optical devices in a direction different from the optical axis, and in which the at least one optical group includes an optical group immovable for zooming and having optical devices arranged from the diaphragm toward the image side in an order of the device with positive refractive power and the device with negative refractive power.

According to another aspect of the present invention, an image-pickup apparatus includes a zoom optical system and a photoelectric transducer for receiving the image formed by the zoom optical system, in which the zoom optical system includes a plurality of optical groups with variable optical power arranged along an optical axis, at least one optical group arranged along the optical axis, and a diaphragm arranged along the optical axis, in which the system is zoomed by changing the power of a plurality of the optical groups with variable optical power, where a plurality of the optical groups with variable optical power each includes a rotationally asymmetric surface and each can have a plurality of optical devices, which change the power within the respective optical groups by moving the respective optical devices in a direction different from the optical axis, and in which the at least one optical group includes an optical group immovable for zooming and having optical devices arranged from the diaphragm toward the image side in an order of the device with positive refractive power and the device with negative refractive power.

Further features of the present invention will become apparent from the following description of exemplary embodiments with reference to the attached drawings.

BRIEF DESCRIPTION OF THE DRAWINGS

FIG. 23 is a lens sectional view according to a second exemplary embodiment.

DESCRIPTION OF THE EMBODIMENTS

Figure 1:
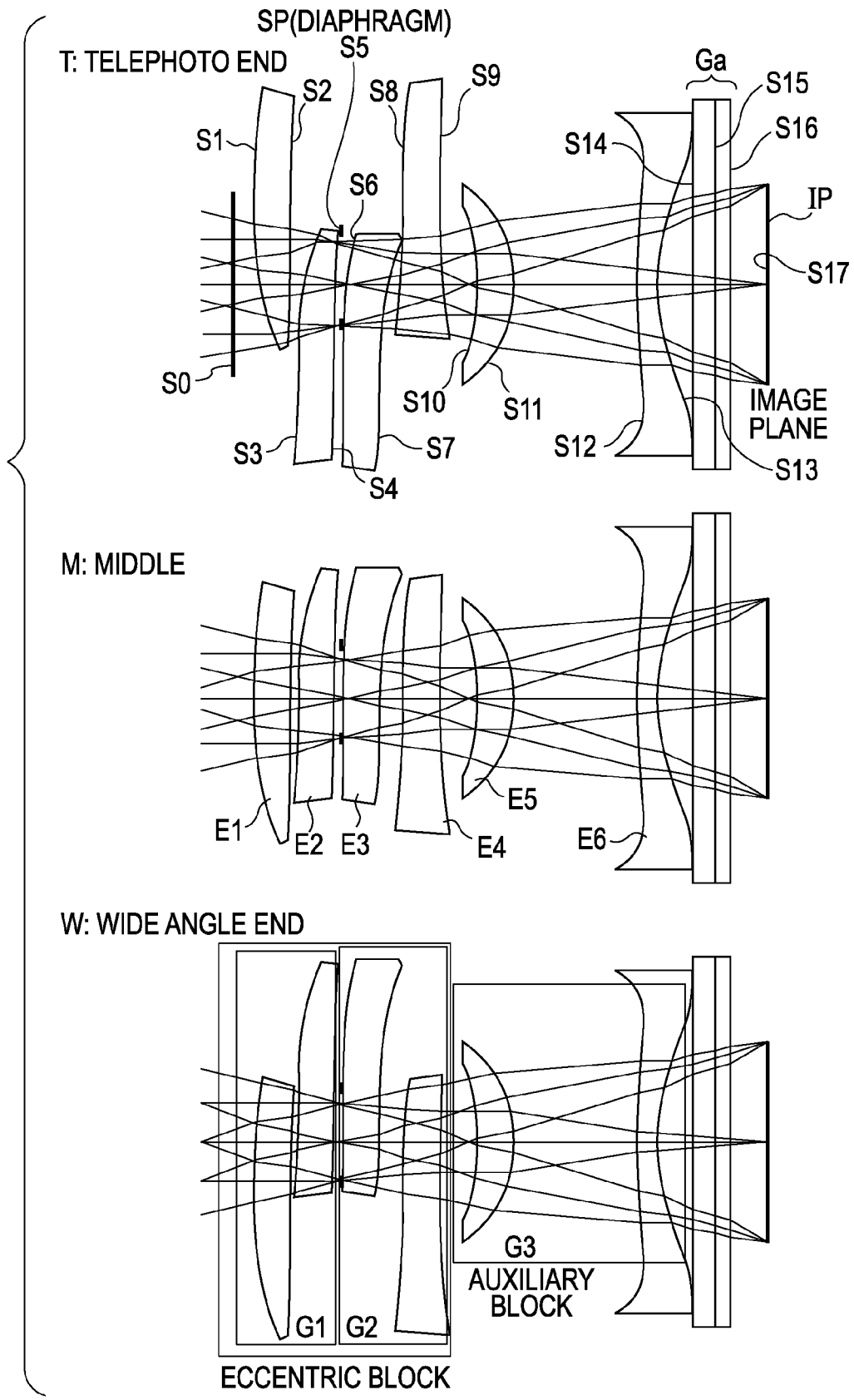
FIG. 1 includes lens sectional views at a telephoto end (T), a middle position (M), and a wide angle end (W) according to a first exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

An exemplary embodiment is directed to a zoom optical system with a short optical length having high optical performances over the total zooming range which can use an optical group, which can have a plurality of optical devices, each moving the respective optical devices in a direction including a rotationally asymmetric surface and being different from an optical axis, and at least one optical group is configured to maintain an image plane constant and reduce aberration during the zooming.

Prior to the description of exemplary embodiments of the present invention, a rotationally asymmetric surface of an off-axial optical system forming a zoom optical system according to at least one exemplary embodiment will be first described including features of it's data expression.

Figure 2:
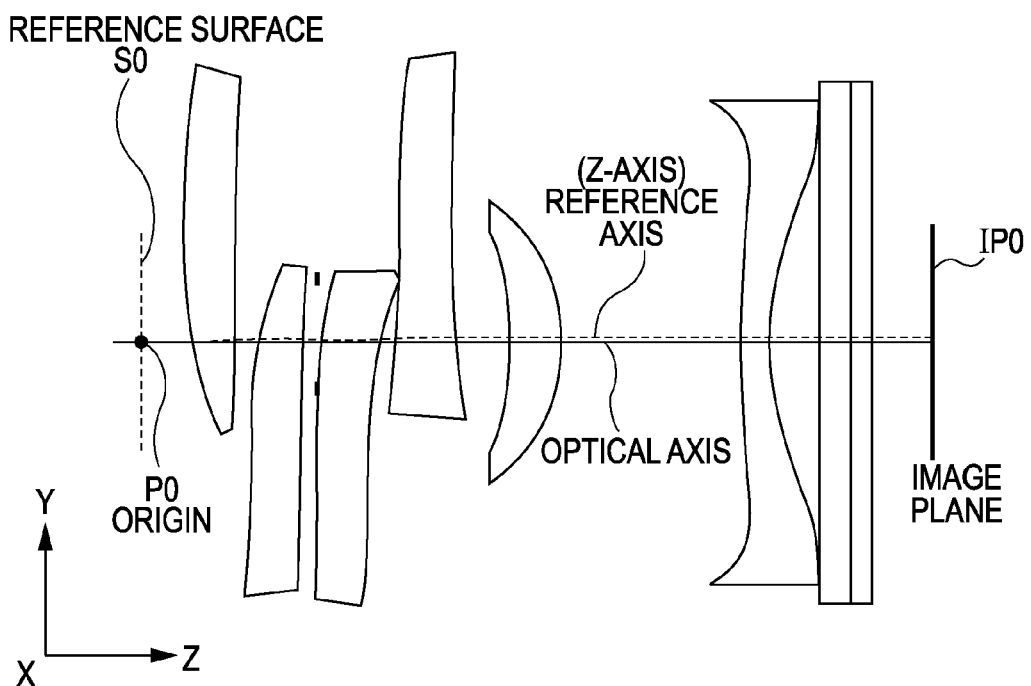
FIG. 2 is an explanatory view of an off-axial optical system of a comparative example 1.

In the off-axial optical system, which is below-mentioned Comparative Example 1 shown in FIG. 2, an absolute coordinate system using the center PO of a reference surface S0 as the origin is established when a light incident surface is assumed as the reference surface S0. A light path passing through the origin PO and the pupil center is assumed as a reference axis.

A straight line connecting the image center IPO to the origin of the absolute coordinate system is determined to be the Z axis, and the direction toward the image center from the first face designates the positive direction. The Z-axis is assumed as the optical axis. When this zoom optical system includes an optical device which can have a rotationally symmetric surface, its rotationally symmetric axis can also be assumed as the optical axis. Also, an axis parallel to the normal to an image-pickup device (photoelectric transducer) such as a CCD or CMOS (an axis passing through the substantial center of the CCD if possible) can be assumed as the optical axis.

Furthermore, the Y axis can be defined as a straight line passing through the origin and making an angle of 90° counterclockwise relative to the Z axis according to the definition of a right-handed coordinate system. The X axis can be defined as a straight line passing through the origin and perpendicular to the Z axis and the Y axis.

The paraxial values shown below are results of the paraxial tracking of the off-axial unless otherwise specified.

The zoom optical system according to at least one exemplary embodiment includes a rotationally asymmetric asphere, and its shape can be expressed by the following equation.

(Numerical Formula 1)

$$Z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 + C60x^6. \quad (1)$$

Since Numerical Formula 1 has only even-numbered order terms with respect to x, the curved surface defined by (Numerical Formula 1) is the plane-symmetric yz face.

When the following condition is satisfied, the xz face is plane-symmetric.
(Numerical Formula 2)

$$C03 = C21 = C05 = C23 = C41 = t = 0. \quad (2)$$

Furthermore, if the following conditions are satisfied, a rotationally symmetrical surface is shaped.
(Numerical Formula 3)

$$C02 = C20. \quad \text{(Numerical Formula 3)}$$

(Numerical Formula 4)

$$C04 = C40 = C22/2. \quad (3)$$

(Numerical Formula 5)

$$C06 = C60 = C24/3 = C42/3. \quad (5)$$

If the above-conditions are not satisfied, a rotationally asymmetrical surface is shaped.

Rotationally symmetrical surfaces and rotationally asymmetrical surfaces in exemplary embodiments and a comparative example mentioned below are based on Numerical Formulas 1 to 5.

First Exemplary Embodiment

FIG. 1 is a lens sectional view according to a first exemplary embodiment of the present invention.

Referring to FIG. 1, reference characters T, M, and W denote a telephoto end (a zooming position with the least power of the entire system), a middle zooming position, and a wide angle end (a zooming position with the most power of the entire system), respectively.

Figure 5:
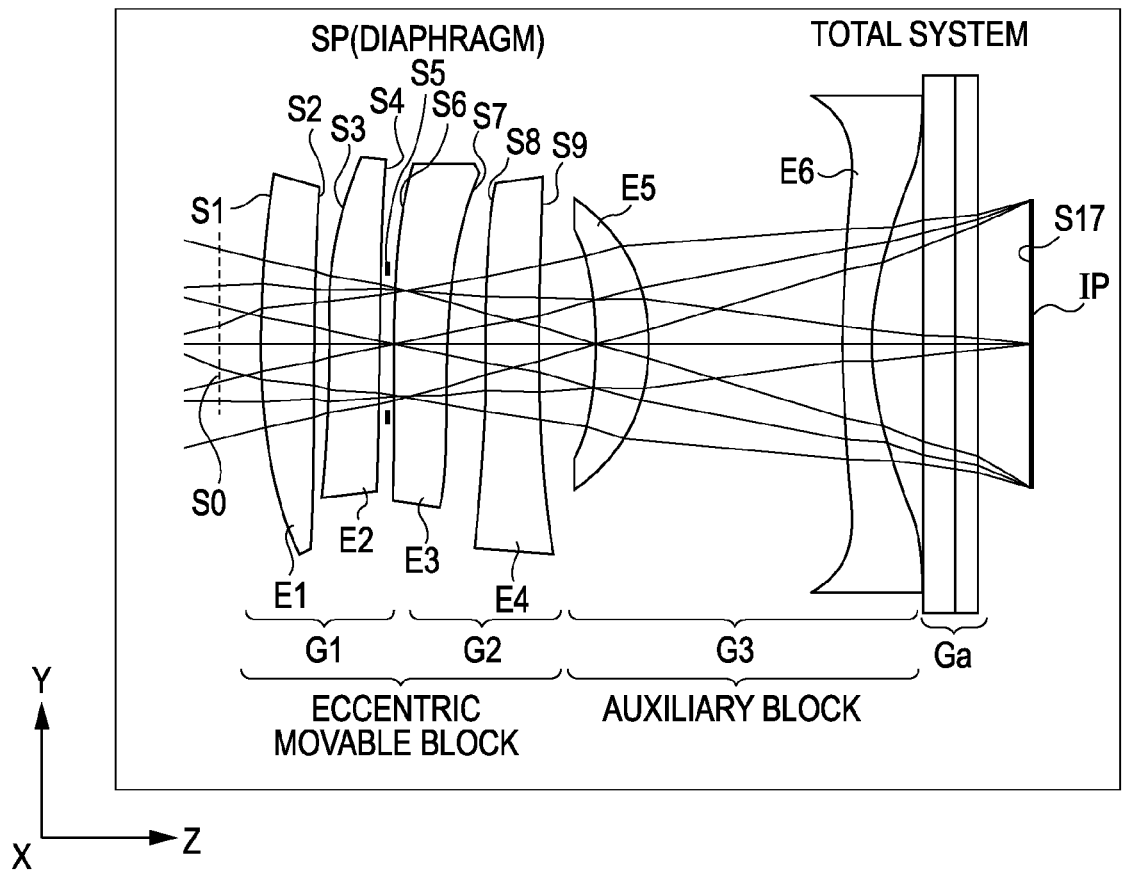
FIG. 5 is a lens sectional view at a middle zooming position according to the first exemplary embodiment.

FIG. 5 is a lens sectional view for illustrating each element at the middle zooming position according to the first exemplary embodiment.

The zoom optical system according to the first exemplary embodiment is an imaging lens system for use in an image-pickup apparatus, and in the lens sectional view, the left is the object side and the right is the image side.

The zoom optical system according to the first exemplary embodiment can also be used for a projector, and in this case, the left is a screen and the right is a surface to be projected.

Referring to FIGS. 1 and 5, in optical groups G1 and G2 (eccentric movable blocks) with variable optical power, the optical power and the focal length are changed during zooming of the zoom optical system according to the exemplary embodiment, and in an optical group G3 (auxiliary block), the optical power is constant.

An aperture stop (diaphragm) SP (S5) is arranged between the optical group G1 and the optical group G2.

By changing the power of the two optical groups G1 and G2 with variable power, the zooming is performed while maintaining a constant image plane IP.

The two optical groups G1 and G2 with variable optical power include the respective rotationally asymmetrical surfaces, and the entire system includes optical devices E1, E2, E3, and E4, which move in a direction substantially different from the optical axis so as to change the power in the optical groups G1 and G2, each group having at least two optical devices.

The optical power refers to the power of a surface located along the optical axis, and when the optical device, which can have a rotationally asymmetric surface, is off-centered so that the surface along the optical axis is changed, the optical power is also changed in accordance therewith.

Exemplary embodiments according to at least one exemplary embodiment will be described. The image-pickup surface of the non-limiting example of the exemplary embodiments is assumed as a CCD with a ¼ inch size (2.7 mm in length×3.6 mm in width). For the brightness, at the wide angle end, F number=4, and at the telephoto end, F number=6.

According to a first exemplary embodiment, the optical system can include six optical devices in total. The optical devices E1, E2, E3, and E4 sequentially arranged from the object side (front) to the image side are rotationally asymmetric and are off-centered in the Y axis direction and their eccentricity is changed continuously.

The positive/negative sign condition of the eccentricity is reverse to each other and the absolute value is the same. The optical devices E5 and E6 are rotationally symmetrically aspheric; however, if aberration asymmetric about the optical axis remains, they also can be rotationally asymmetric for eliminating the aberration. The optical devices E1 and E2 constitute the first optical group G1.

Similarly, the optical devices E3 and E4 constitute the second optical group G2. Regarding to the face number, the reference surface, which is the origin of the absolute coordinate system, is designated as S0; the first face of the optical device E1 is S1; and sequentially designated as S2, S3, S4, thereafter. After the face S4 (in the rear of the optical device E2) there is an aperture stop SP, which is designated as S5. The first face of the optical device E3 is S6, and thereafter, the faces are sequentially numbered, so that the image plane IP is designated as S17.

Rotationally asymmetric groups (the optical devices E1 to E4) continuously off-centered in the Y axis direction and a rotationally symmetric group (the optical devices E5 and E6) are referred below to as eccentric movable blocks and an auxiliary block, respectively.

Since with only the eccentric movable blocks G1 and G2, the power is increased so that the aberration is difficult to be reduced, the auxiliary block G3 is provided. Both surfaces of the rotationally asymmetric optical devices E1 to E4 are rotationally asymmetric shaped. A flat glass plate Ga placed directly before the CCD plane includes an infrared out filter and a cover glass plate of the CCD. The auxiliary block G3 can be immovable in the optical axial direction for the zooming; however, for the purpose other than the zooming, it can be moved. For example, in at least one exemplary embodiment in order to reduce the chance of vibration and to adjust focusing, the auxiliary block G3 can also be moved. This is the same as in embodiments other than the first embodiment.

Lens data according to the first exemplary embodiment are shown in Table 3. The displacement from the Z-axis in each optical device (lens) is shown in Table 4; rotationally symmetric aspheric factors expressed by (Numerical Formula 12) are shown in Table 5; and polynomial surface factors expressed by Numerical Formula 1 are shown in Table 6.

$$Z = \frac{ch^2}{1+\sqrt{1-c^2h^2}} + Ah^4 + Bh^4 \quad (12)$$

(Numerical Formula 12)

where the radius of curvature is c and factors are A and B, and the Formula 12 satisfies h2=X2+Y2.

FIG. 1 is a light path diagram at this time, showing the telephoto end (position with the least power of the entire optical system), the middle zooming position, and the wide angle end (position with the most power of the entire system) arranged in that order.

The light incident on the reference surface S0 enters first the first optical group G1. The first optical group G1 includes the two optical devices E1 and E2, and the numbered faces are S1 to S4.

The optical devices E1 and E2 are off-centered in the Y axis direction, and the positive/negative sign condition of the eccentricity, as illustrated in Table 4, is reverse to each other and the absolute value is the same.

Thereby, the power of the first optical group G1 is changed from the positive to the negative during the zooming from the telephoto end to the wide angle end. The light emitted from the first optical group G1 then passes through the aperture-stop S5 (SP) so as to enter the second optical group G2. The second optical group G2, in the same way as in the first optical group G1, includes the two optical devices E3 and E4, and the numbered faces are S6 to S9. The optical devices E3 and E4 are off-centered in the Y axis direction, and the positive/negative sign condition of the eccentricity, as illustrated in Table 4, is reverse to each other and the absolute value is the same.

Thereby, the power of the second optical group G2 is changed from the negative to the positive during the zooming from the telephoto end to the wide angle end. The light passed through the eccentric movable blocks G1 and G2 then enters the auxiliary block G3, which covers the power of the eccentric movable blocks G1 and G2. The auxiliary block G3 includes the two optical devices E5 and E6, which include rotationally asymmetric and aspheric faces S10 to S13. The light passed through the optical devices E5 and E6 passes through the infrared out filter and the cover glass plate Ga of the CCD so as to focus without changing the image plane IP.

Figure 7A:
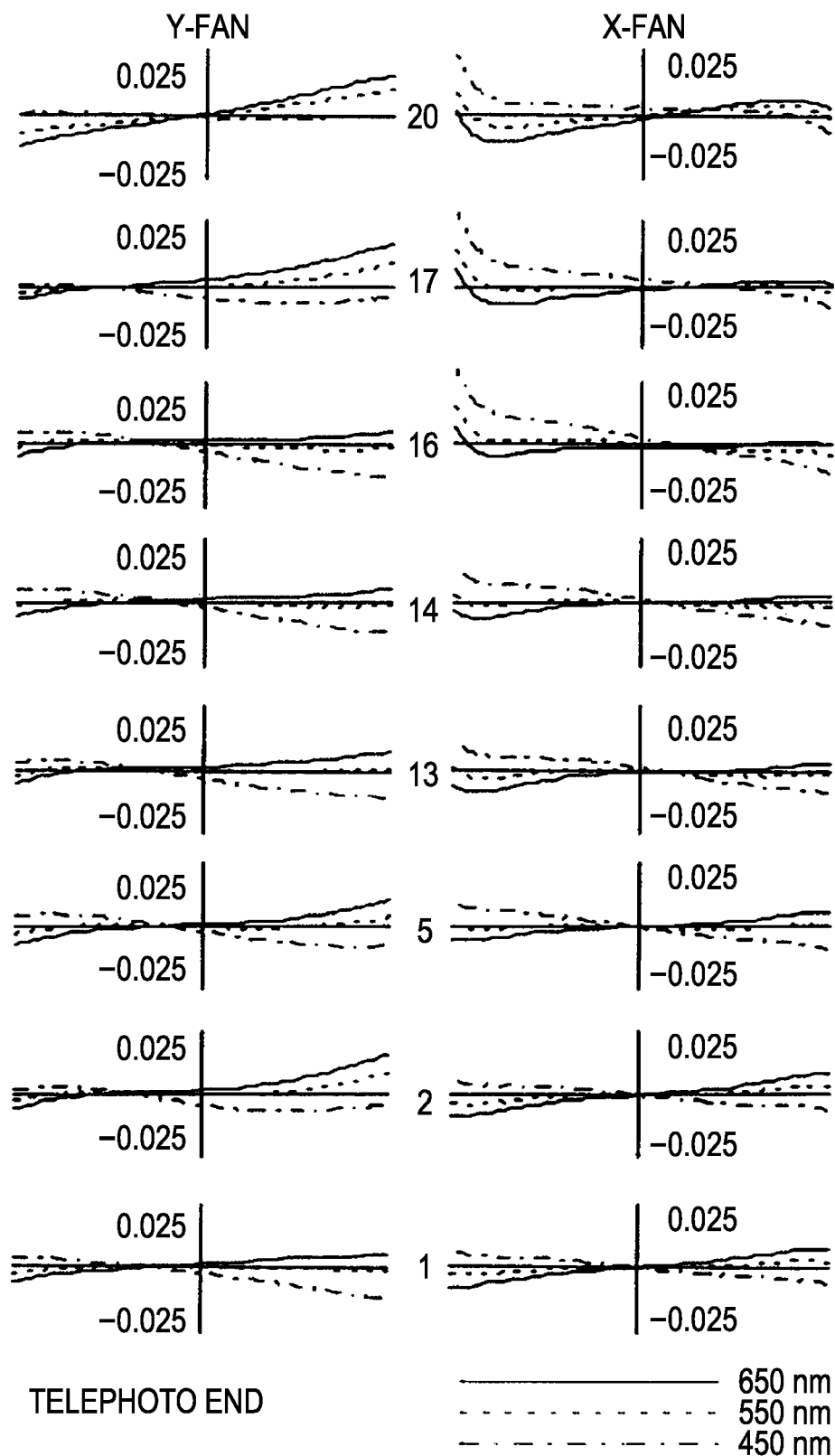
FIG. 7A includes aberration drawings according to the first exemplary embodiment shown in FIG. 1 for the telephoto end position.
Figure 7B:
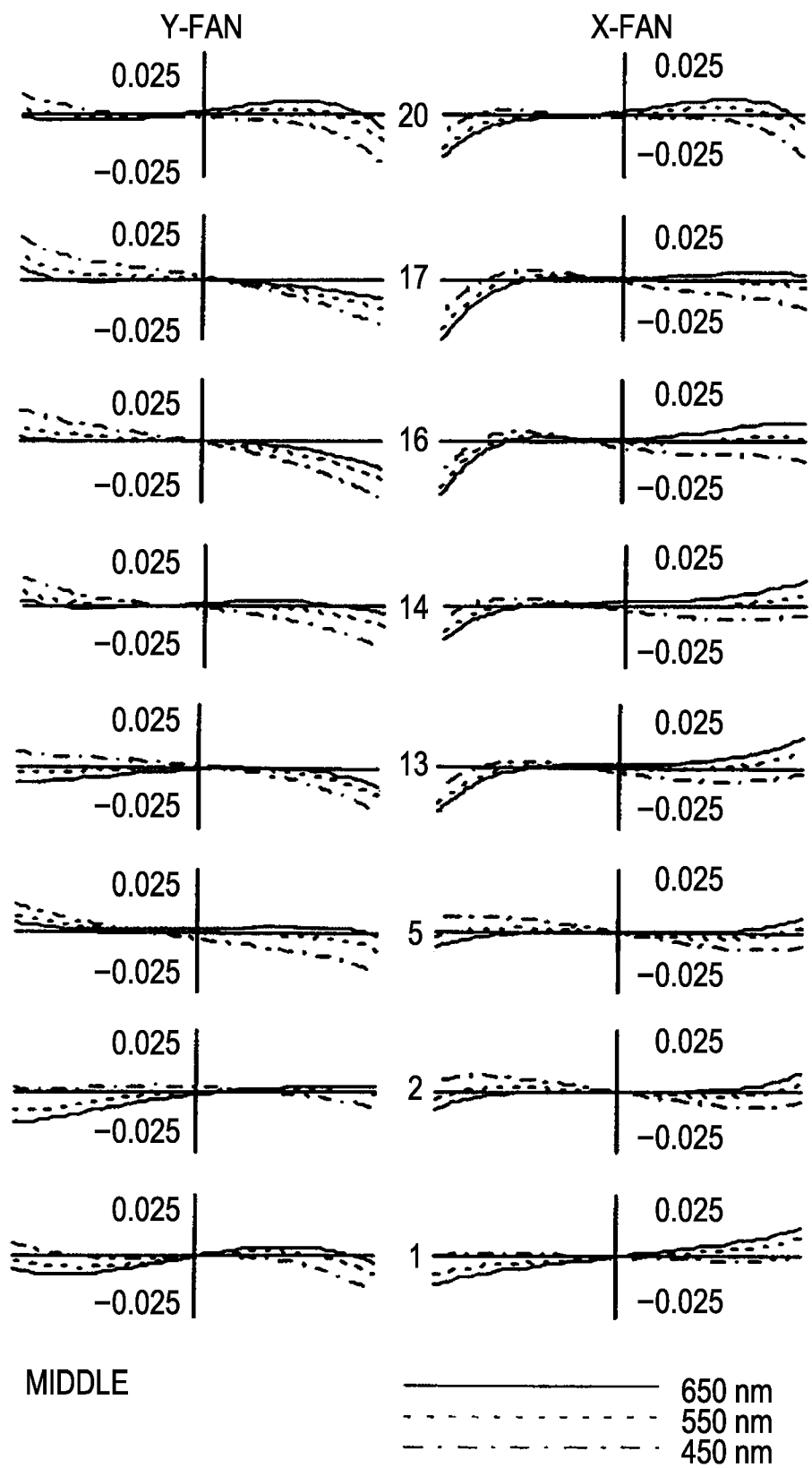
FIG. 7B includes aberration drawings according to the first exemplary embodiment shown in FIG. 1 for a middle position.
Figure 7C:
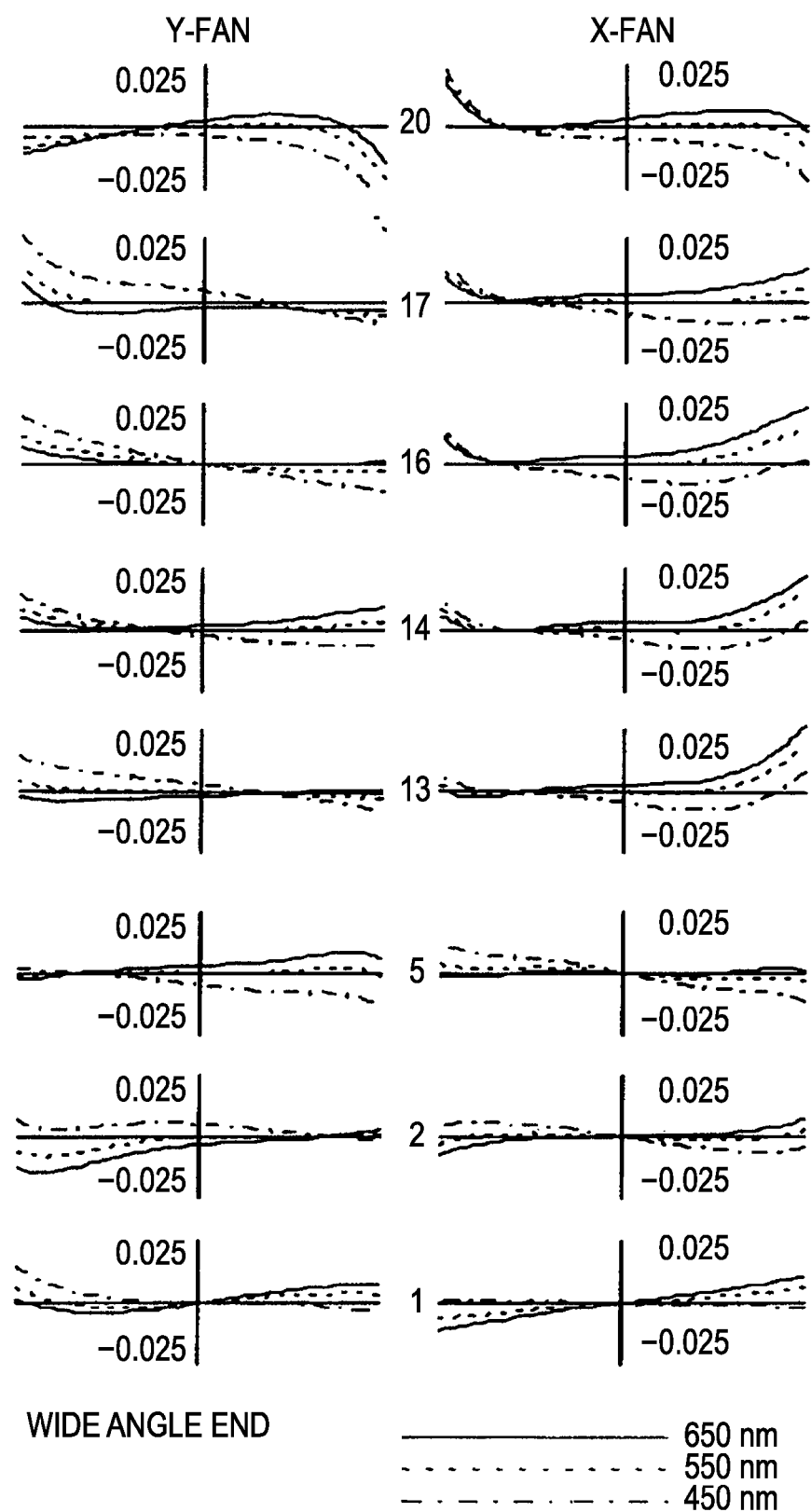
FIG. 7C includes aberration drawings according to the first exemplary embodiment shown in FIG. 1 for the wide angle end position.
Figure 8:
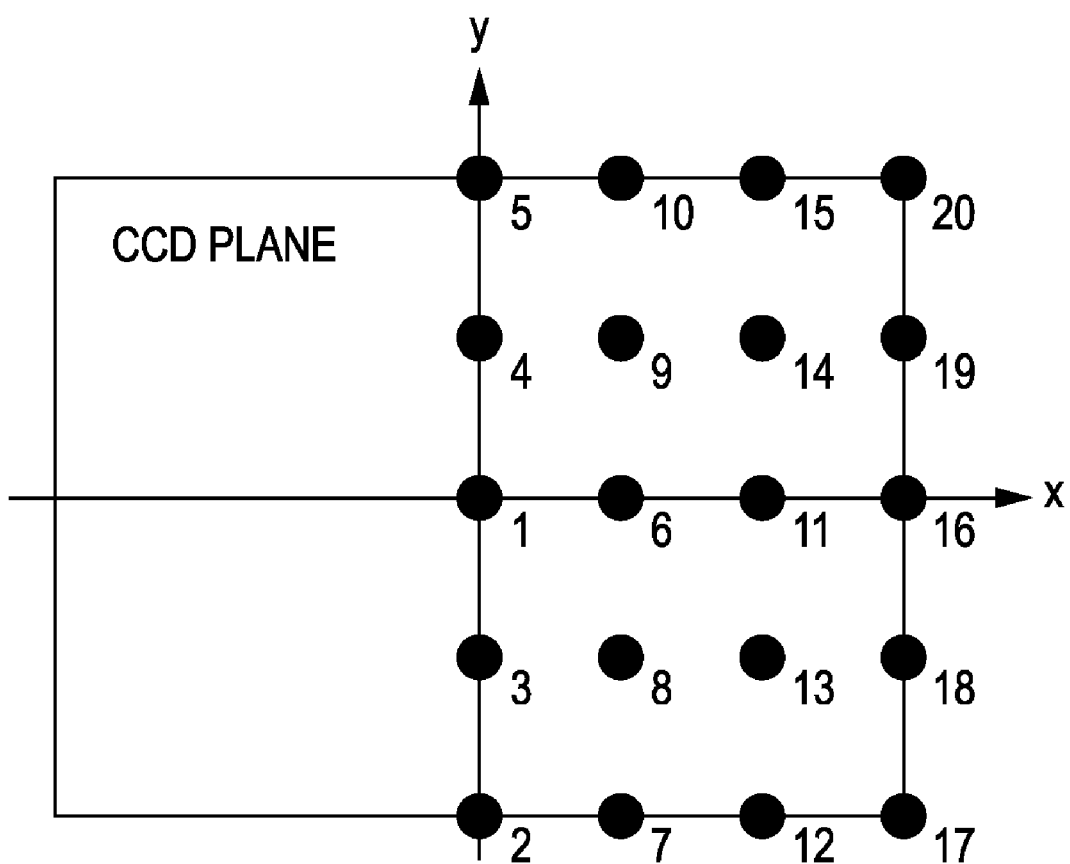
FIG. 8 is a drawing showing light numbers on an image plane according to the first exemplary embodiment shown in FIG. 1.

FIGS. 7A, 7B, and 7C are aberration diagrams at the telephoto end (T), the middle zooming position (M), and the wide angle end (W), respectively. The light position on the pupil is plotted in abscissa and the displacement from the principal light on the image plane in ordinate. The range of the ordinate is about ±20 μm. Numbers in FIGS. 7A to 7C are field angular numbers, and on the image plane (image-pickup device), they are shown in FIG. 8. Since the data are symmetric with respect to the X axis, only the positive side can be considered in the X axis direction. In the ray at a field angle of 0°, it is understood that coma be well corrected over the range from the telephoto end to the wide angle end.

Figure 9:
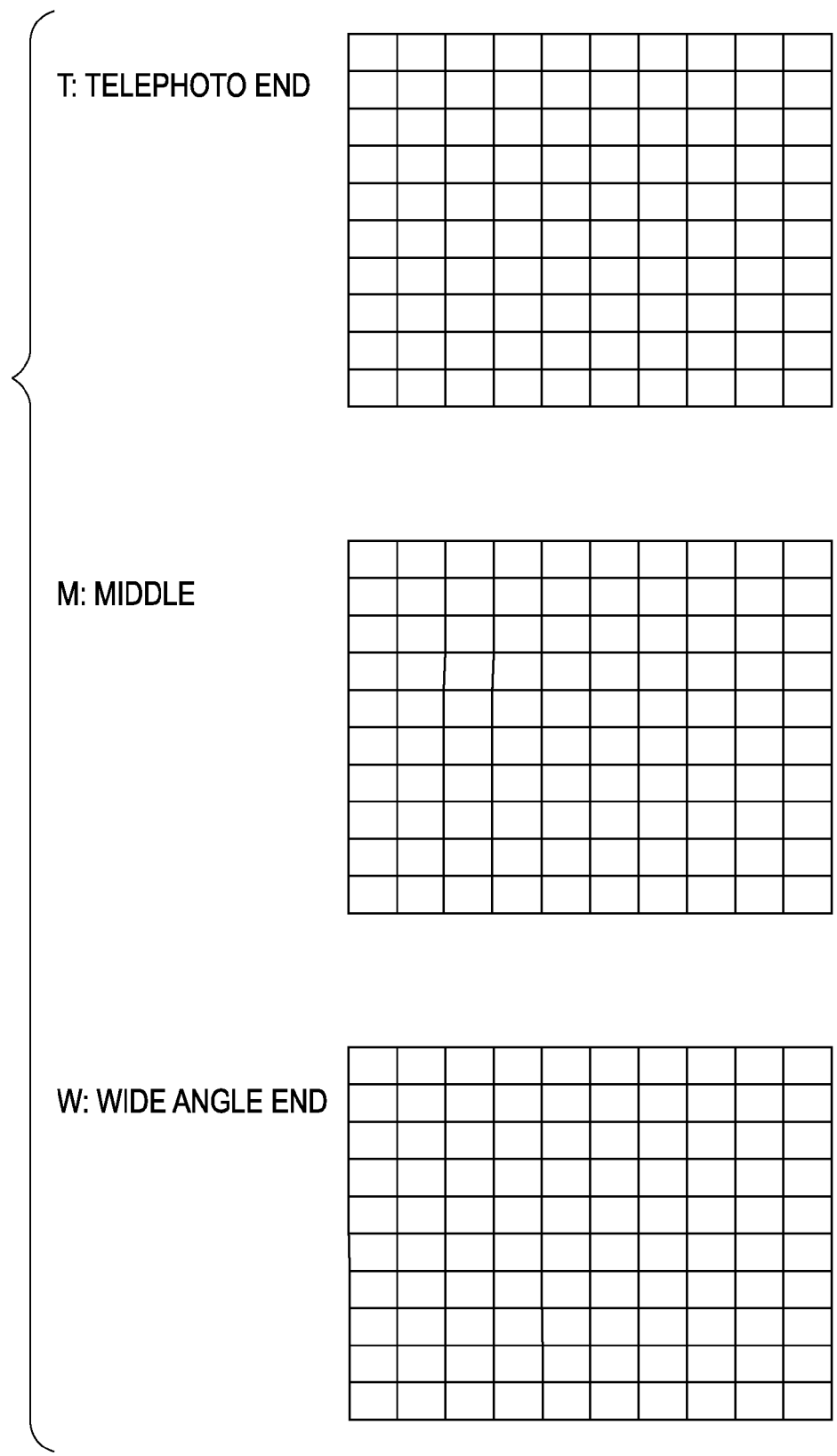
FIG. 9 includes distortion grating drawings at the telephoto end, the middle zooming position, and the wide angle end according to the first exemplary embodiment.

FIG. 9 shows distortion gratings at the telephoto end (T), the middle zooming position (M), and the wide angle end (W). The grating has a ¼ inch size (2.7 mm in length×3.6 mm in width). From this, it is understood that the distortions can be also satisfactorily suppressed.

It has already described that since with only the eccentric movable blocks G1 and G2, the power is increased so that the aberration is difficult to reduce, the auxiliary block G3 is provided. Furthermore, according to the embodiment, the auxiliary block G3 which includes two coaxial optical devices (coaxial lenses) E5 and E6 is arranged adjacent to the image plane of the eccentric movable block G2. The two coaxial optical devices E5 and E6 can be arranged in order of the positive/negative refractive power from the aperture stop SP toward the image side (as moving away from the aperture stop SP) so as to subsidize the eccentric movable blocks G1 and G2.

This system is a generally known telephoto type, and in comparison with the system without the coaxial optical devices E5 and E6, the back focus (the distance from the final optical surface to the image plane IP) can be reduced.

Figures 29, 30:
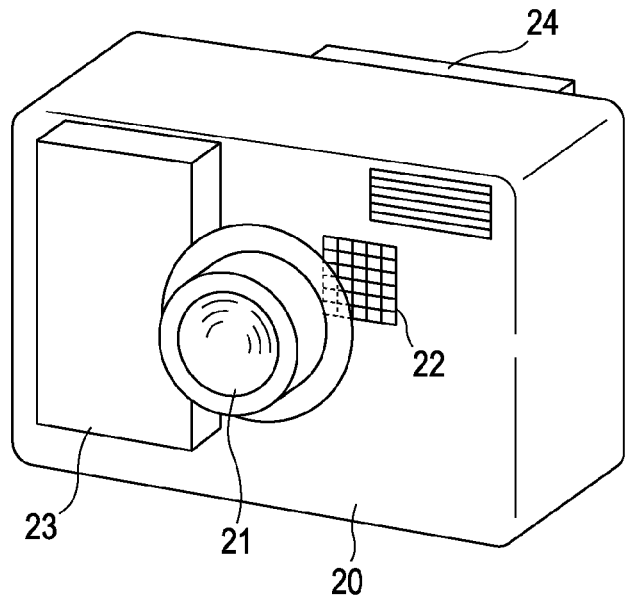
FIG. 29 is an exterior perspective view of a digital still camera incorporating a zoom optical system.
FIG. 30 provides a table comparing lens data from an example carried out based upon Japanese Patent Laid-Open No. H02-119103 and corrected in a /1;4-inch size scale according to the first exemplary embodiment.

FIG. 30 illustrates the comparison of the lens data example carried out based on Japanese Patent Laid-Open No. H02-119103 and corrected in a ¼-inch size scale with the first exemplary embodiment. When comparing the total distances after the eccentric movable blocks G1 and G2, it is apparent that the comparative example has a distance of 9.77 mm and the first exemplary embodiment has a distance of 4.42 mm (total of S9 to S16), which is less than the half of the former. Hence, when the two coaxial optical devices E5 and E6 forming the auxiliary block G3 can be arranged in power order of the positive/negative refractive power as moving away from the aperture stop SP, the back focus can be reduced.

Furthermore, the first exemplary embodiment can satisfy the following condition:

φn<φp, where φp is the power the optical device E5 with positive refractive power and φn is the power the optical device E6 with negative refractive power.

At the full-zooming position, the first exemplary embodiment satisfies the following condition:

|φd|max<|φs|max, where |φd|max is the maximum absolute value of each optical power of the optical devices E1 to E4 in a plurality of optical groups with variable optical power, and |φs|max is the maximum absolute value of each optical power of the optical devices E5 and E6 in the optical groups.

Figure 12:
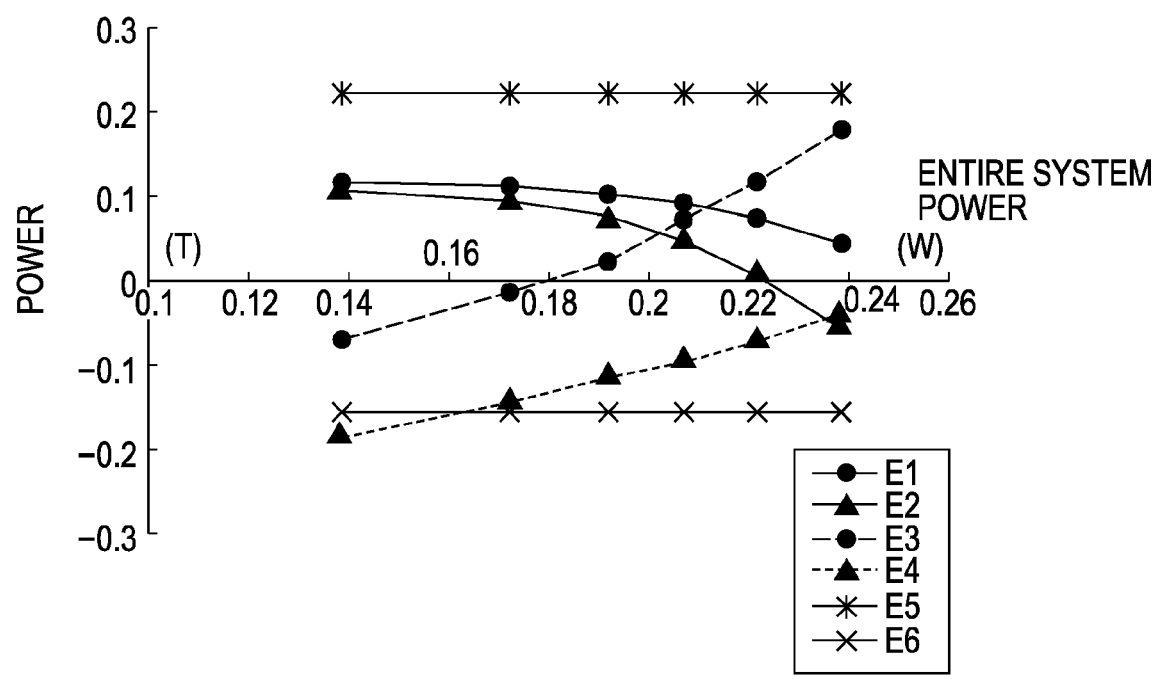
FIG. 12 is a drawing illustrating the changes in power of optical devices E1, E2, E3, and E4 according to the first exemplary embodiment shown in FIG. 1.

Thereby, the power of the eccentric movable block (e.g., G1 and/or G2) is reduced and the obtained image quality is highly refined. FIG. 12 shows changes in power for every optical devices E1 to E6 relative to the entire system power. From this, it is understood that the condition φn<φp and the condition |φd|max<|φs|max be satisfied.

At the wide angle end, the power of entire system is increased and each power of the groups tends to increase. In general, aberration is apt to generate in the high power optical system. Although we cannot avoid the increased entire system power at the wide angle end, if the power of the individual groups is reduced, the aberration can be suppressed. From power changes shown in FIG. 3, the power of the first group G1 linearly changes relative to the entire system power while the second group G2 changes in a curve. This is apparent from Numerical Formula 8 and Numerical Formula 9. However, there are various solutions of these formulas according to the curved surface of the rotationally asymmetric optical device and the displacement. If the power at the wide angle end can be reduced by this solution, the aberration can be suppressed.

Figure 10:
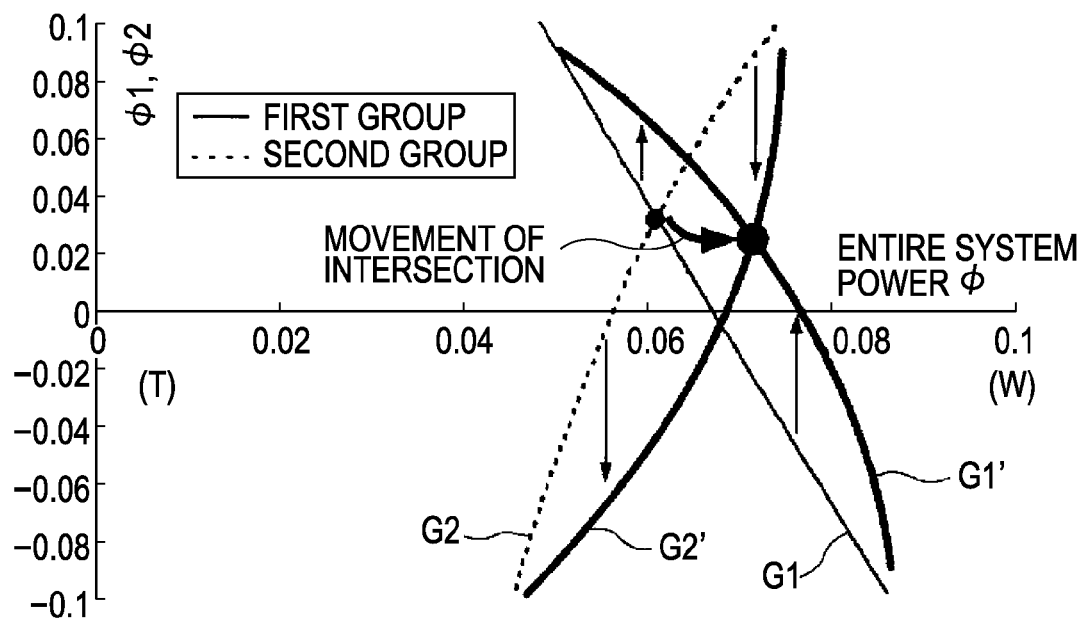
FIG. 10 is a drawing illustrating the power intersection of optical groups G1 and G2 shifting toward the wide angle side according to the first exemplary embodiment.

For this end, as illustrated in FIG. 10, the linear change G1 of the first group G1 is made line G1' curved in the positive power direction and the second group G2 is made line G2' curved in the negative power direction. By such a configuration, although the power is increased at the telephoto end, the power can be reduced at the wide angle end. That is, the intersection of both the lines, at which both the power changes agree with each other, can be located on the wide angle side. Also, if the larger absolute power value (G2) in the first and second groups G1 and G2 at the wide angle end is to be |φgw|max, and the smaller absolute power value (G1) in the first and second groups G1 and G2 at the telephoto end is to be |φgt|min, Numerical formula 13 can be satisfied.
(Numerical Formula 13)

$$|\phi gw|max < |\phi gt|min \tag{2}$$

Figure 11:
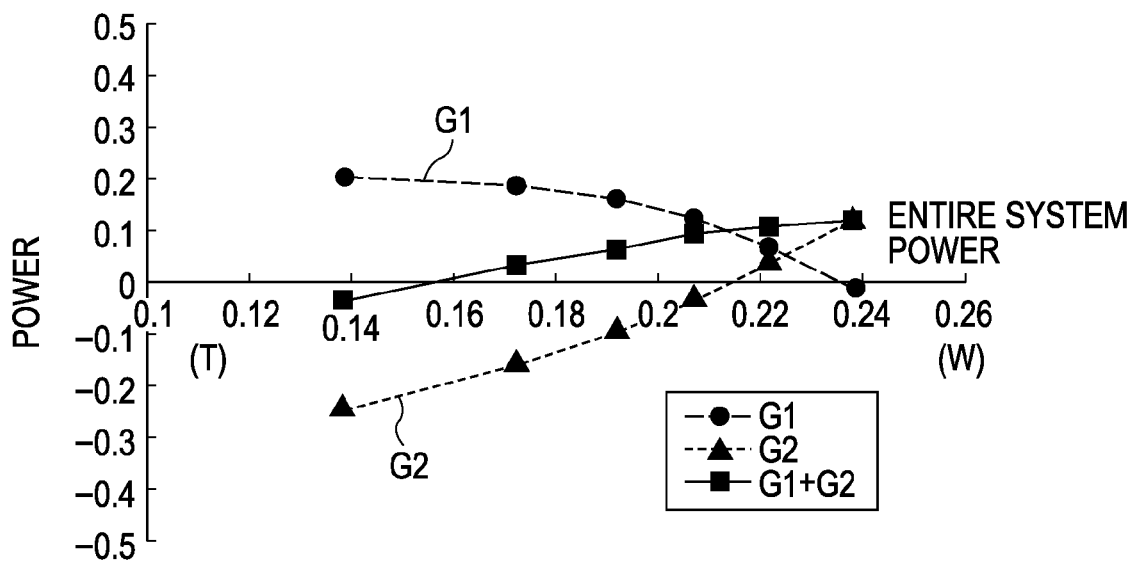
FIG. 11 is a drawing illustrating the changes in power of the optical groups G1 and G2 according to the first exemplary embodiment shown in FIG. 1.

Then, FIG. 11 illustrates the relationship between the power change of the entire system, the power changes in respective first and second groups G1 and G2, and the change in composite power G1+G2 of the first and second groups G1 and G2. From this, as the power of the entire system increases, the power of the eccentric movable block first group G1 changes from the positive to the negative and the second group G2 changes in power from the negative to the positive.

The intersection is located on the wide angle side (W), and the power absolute value on the wide angle side is smaller than that on the telephoto side. By reducing the power absolute value of the respective groups on wide angle side, the aberration is suppressed.

Furthermore, by reversing the positive/negative sign condition of the power (refractive power) of the optical device forming the group, the aberration is also suppressed. Therefore, the power arrangement within each group is reversed from the positive to the negative at the wide angle end where the aberration is apt to be generated. Then, FIG. 12 illustrates the changes in each power of the optical devices E1 to E6 relative to the power of the entire system. The power of the optical devices E5 and E6 herein is obviously not changed. In the power changes of the optical devices E1 to E4, the positive, the positive, the negative, and the negative can be arranged at the telephoto end within the group from the object side in that order. Whereas, in the power changes at the wide angle end, the positive, the negative, the positive, and the negative can be arranged in that order.

The first and second groups G1 and G2 include optical devices with sign conditions reverse to each other.

As the power of the entire system changes, the power of the eccentric movable blocks G1 and G2 changes while the auxiliary block G3 is maintained constant. The power of the entire system can be obtained from the power of these two blocks and the principal distance. In order to have desired power of the entire system, various power arrangements of the two blocks can be considered. However, if the power of the eccentric movable blocks G1 and G2 is increased, the aberration generated along therewith is increased so that the aberration is difficult to be suppressed. Hence, the power of the eccentric movable blocks G1 and G2 can be smaller than or substantially equal to that of the auxiliary block G3. Then, at the telephoto end where the power of the entire system is small, the following condition can be satisfied:
(Numerical Formula 14)

$$|\phi dt| \leq |\phi st| \tag{14}$$

where |φdt| is the power absolute value (total sum) of the eccentric movable blocks (G1+G2), and |φst| is the power absolute value of the auxiliary block G3.

Figure 6:
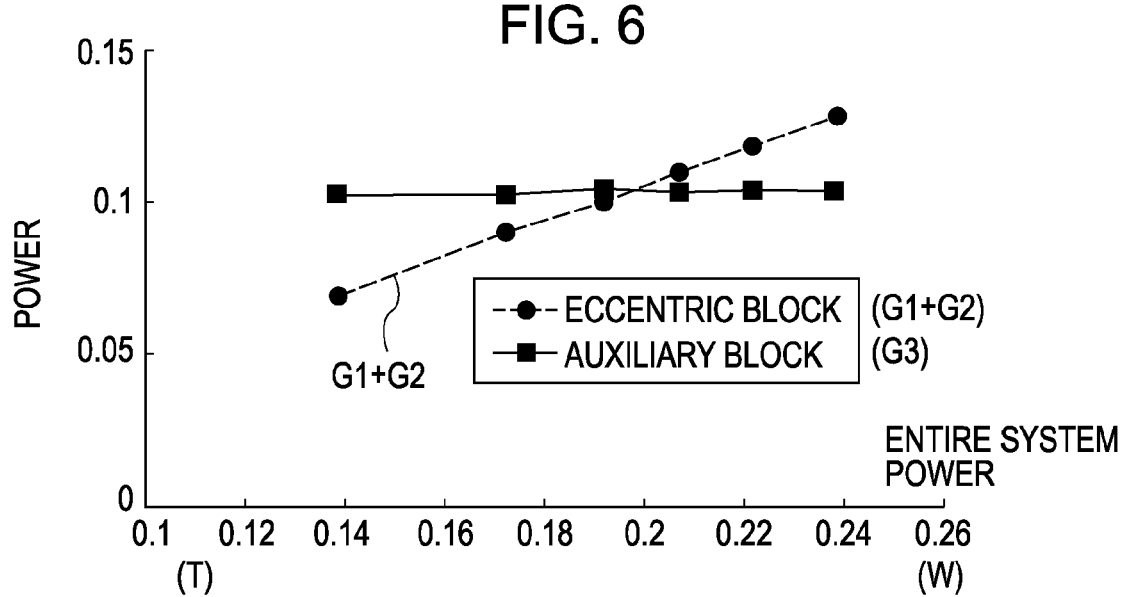
FIG. 6 is a drawing showing changes in power of an eccentric movable block and an auxiliary block according to the first exemplary embodiment shown in FIG. 1.

FIG. 6 illustrates the power (total sum) of the eccentric movable blocks (G1+G2) and the power of the auxiliary block G3 according to the first exemplary embodiment. It is understood that Numerical Formula 14 can be satisfied.

It is generally known that when Petzval is large, the curvature of field is increased, and vice versa. According to the embodiment, by reducing the Petzval, the curvature of field is also suppressed to be small. The Petzval is given by the following equation:
(Numerical Formula 15)

$$PEi = \phi Ei/nEi, \tag{15}$$

where φEi is the power of the optical device Ei (i=1 to n) and nEi is the index of refraction of the material.

In the general zoom optical system using the coaxial optical device, the Petzval value can be constant. However, in the optical system in that the optical device is continuously eccentric so as to change the power, the value is not constant. For the change in power, since the change is small at positions where the index of refraction of the glass material ranges from about 1.45 to about 1.9, the change in Petzval can be the change in power. Then, in order to suppress the Petzval, the power changing range is established so as to satisfy the following equation:
(Numerical Formula 16)

$$-|\phi|max \leq \phi 12 \leq |\phi|max, \tag{16}$$

where |φ|max is the maximum absolute value of the power of the first and second groups G1 and G2 at the entire zooming position, and φ12 is the sum of the first and second groups G1 and G2.

In the change in power of FIG. 11, it is understood that the power sum G1+G2 of the first and second groups G1 and G2 can be within the range for at least one exemplary embodiment.

Then, the Petzval is examined. Table 7 illustrates the Petzval values of the groups E1 to E6, the eccentric movable blocks (G1+G2), the auxiliary block G3, and the entire system. Similarly, Table 8 shows a conventional example as a comparative example.

When comparing the sums of the Petzval in both the tables, according to the first exemplary embodiment, the Petzval is reduced. Since the sum of the Petzval in the auxiliary block G3 is substantially zero, the curvature of field is reduced by two optical devices with the positive and negative refractive power in the auxiliary block G3.

From this, the Petzval sum of the entire system can be substantially entirely contributed by the eccentric movable blocks G1 and G2. Then, in view of the Petzval of the eccentric movable blocks G1 and G2, it is understood that the Petzval at the telephoto end be low −0.13 and at the middle zooming position and the wide angle end, the Petzval be 0.3 about the half of that of the conventional example. This enables the curvature of field to be reduced.

In the aberration diagram in practice, while at the middle zooming position and the wide angle end, the curvature of field is generated, at the telephoto end, there is not the curvature of field but the inclination of the image plane. From this, the sum of the Petzval corresponds to the aberration.

Figure 13:
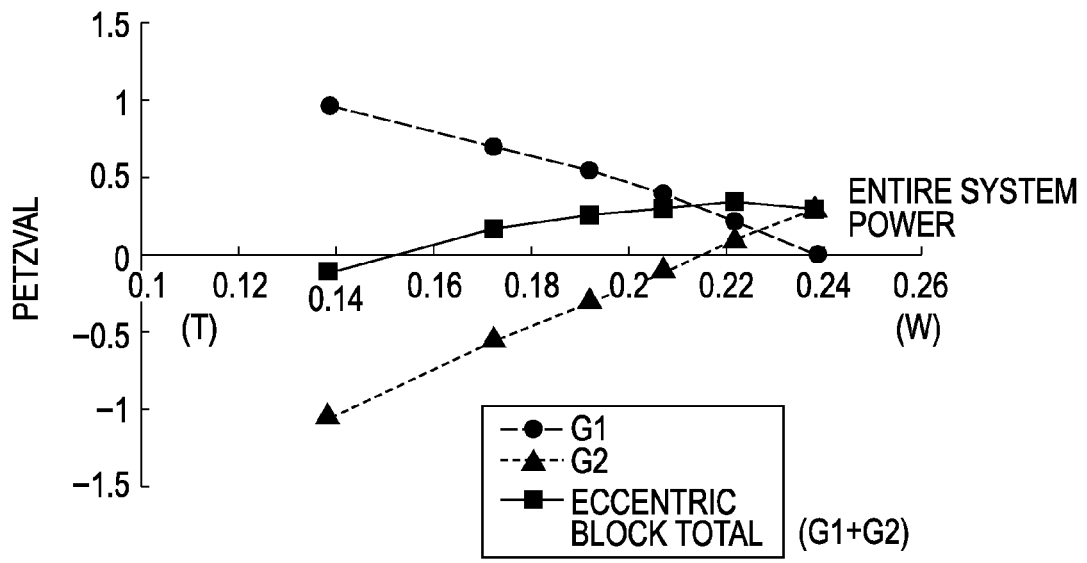
FIG. 13 is a drawing illustrating the changes in Petzval according to the first exemplary embodiment shown in FIG. 1.
Figure 14:
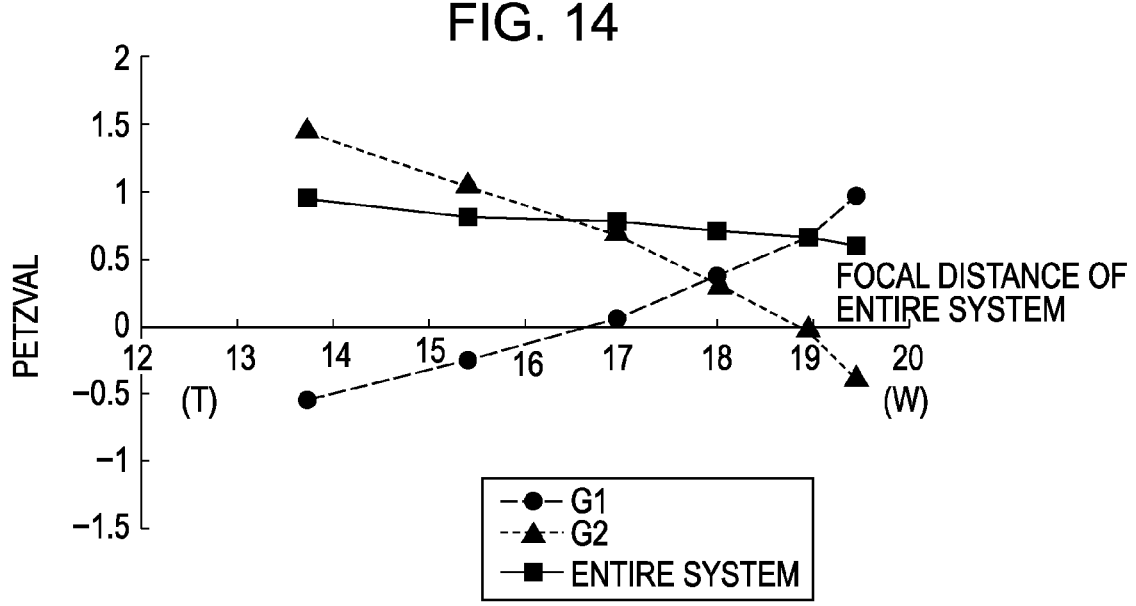
FIG. 14 is a drawing illustrating the changes in Petzval of lenses designed on the basis of the comparative example 1.

Then, FIG. 13 illustrates the change in sum of the Petzval relative to the power of the first and second groups G1 and G2 and the entire system of the first and second groups (G1+G2). FIG. 14 shows a conventional example as a comparative example. When comparing these data, although in the absolute value of the sum of the Petzval of the respective first and second groups G1 and G2 the conventional example is substantially the same as the first exemplary embodiment, in their changes, the first exemplary embodiment is smaller than the conventional example. According to the first exemplary embodiment, the positive Petzval of the first group G1 cancels the negative Petzval of the second group G2, so that the sum of these, which is nearly zero, changes. Whereas, in the conventional example, the Petzval of the first group G1 does not cancel that of the second group G2, so that the sum of these can be positive. These two results are obtained from that the power $\phi 12$ is maintained within the above-mentioned range. In such a manner, the curvature of field has been reduced according to the first exemplary embodiment.

If the positive/negative sign conditions of the power of the first and second groups G1 and G2 are reverse to each other and the absolute values thereof are the same, since the index of refraction of the glass material is maintained within the limited range, the Petzval can be set at close to zero, so that the curvature of field can be reduced. If the positive/negative sign conditions of the power of the first and second groups G1 and G2 are only reverse to each other and the absolute values thereof are related to each other, the sum of the Petzval can be principally reduced. However, if the first and second groups G1 and G2 have such power, the entire system may have a power that is decreased so that it can be difficult to expand angular field. A method for obtaining the power of the entire system while suppressing the sum of the Petzval is given by the following equation:

(Numerical Formula 17)

$$\phi total = \phi 1 + \phi 2 - e\phi 1 e\phi 2, \qquad (17)$$

where $\phi total$ is the total power of the eccentric movable blocks G1 and G2, $\phi 1$ and $\phi 2$ are the power of the first and second groups G1 and G2, respectively, and e is the principal distance between the first and second groups G1 and G2.

It is understood that when the positive/negative sign conditions of the power $\phi 1$ and $\phi 2$ are only reverse to each other and the absolute values thereof are similar as well as the glass material is not changed, in at least one exemplary embodiment, the principal distance e can be increased as large as possible for increasing the total power $\phi total$. Then, the principal distance of the first exemplary embodiment has been compared with that of the conventional example. Since in both the examples, the power of the entire system is different, the principal distances relative to the power of the entire system are compared. The results are shown in Table 9 and Table 10.

When comparing these, although the principal distances are substantially the same at the telephoto end and the wide angle end, at the middle position, the principal distance of the first exemplary embodiment is larger. Hence, according to the first exemplary embodiment, while maintaining the power absolute value identical, the power of the entire system is increased by expanding the principal distance.

In order to reduce upper-line and lower-line displacements of axial light (referred to as axial coma) generated in the first exemplary embodiment, the angle of a light ray defined by the optical axis is suppressed according to the first exemplary embodiment.

Figure 15:
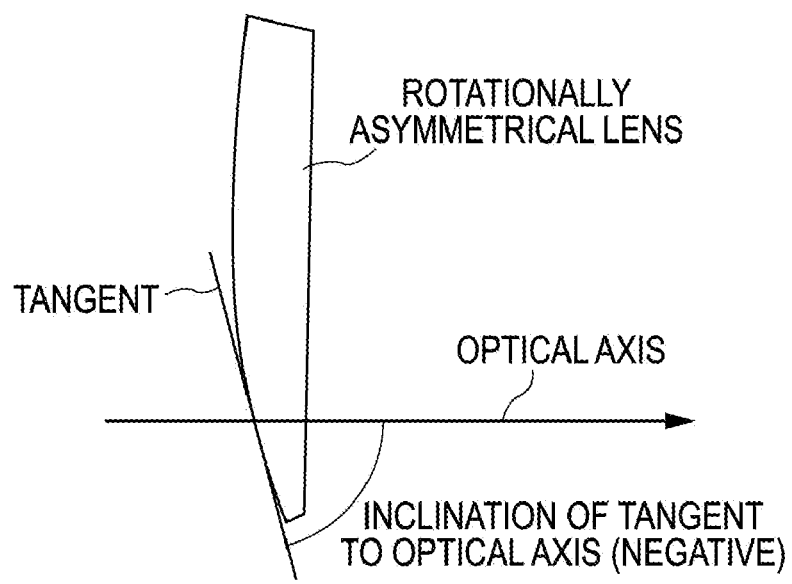
FIG. 15 is a drawing for defining the tangent of a face.

Then, as illustrated in FIG. 15, the inclination of the tangent at an intersection of each face Si and the optical axis is considered. When the tangent of a certain face has a positive inclination to the optical axis, by arranging a face having a negative inclination, the angle of a light ray defined by the optical axis can be suppressed so as to reduce the axial coma. Thus, each face has the inclination as illustrated in the light path diagram of FIG. 5. For example, while in the face S1 at the telephoto end, the tangent is inclined negatively to the Y axis, the tangent of the face S3 is positively inclined so as to reduce the axial coma by the reverse correction. By reducing the total sum thereof, the axial coma can be suppressed. Then, the inclination is maintained within the following range:

(Numerical Formula 18) \hfill (18)

$$\left| \sum_i K_i \right| < K_{max}$$

where i is a face number expressed by Si, Ki is the inclination of the face Si, Kmax is the maximum inclination, and $\Sigma Ki$ is the total sum of inclinations Ki of optical faces of the entire system.

The power $\phi$ of the face is given by the following equation on the basis of "KOGAKU (Japanese Journal of Optics)" Vol. 29, No. 3 (2000):

(Numerical Formula 19)

$$\phi = 2(N' \cos \theta' - N \cos \theta) C, \qquad (19)$$

where C is a local curvature of the curved surface, N and $\theta$ are the index of refraction and the incident angle on a light incident side, respectively, and N' and $\theta'$ are those on a light emission side, respectively.

From this equation, it is understood that although the local curvature is the same, the power changes with the index of refraction, the incident angle, and the angle of emergence before and behind the curved surface. Also, the following condition can be satisfied on the basis of Snell's law:

(Numerical Formula 20)

$$N \sin \theta = N' \sin \theta'. \qquad (20)$$

When substituting Numerical Formula 20 for Numerical Formula 19 so as to eliminate $\theta'$, the following equation is derived:

(Numerical Formula 21) \hfill (21)

$$\frac{\varphi}{C_{02}} = 2N' \sqrt{1 - \frac{N^2 \sin^2 \theta}{N'^2}} - 2N \cos\theta$$

Figure 16:
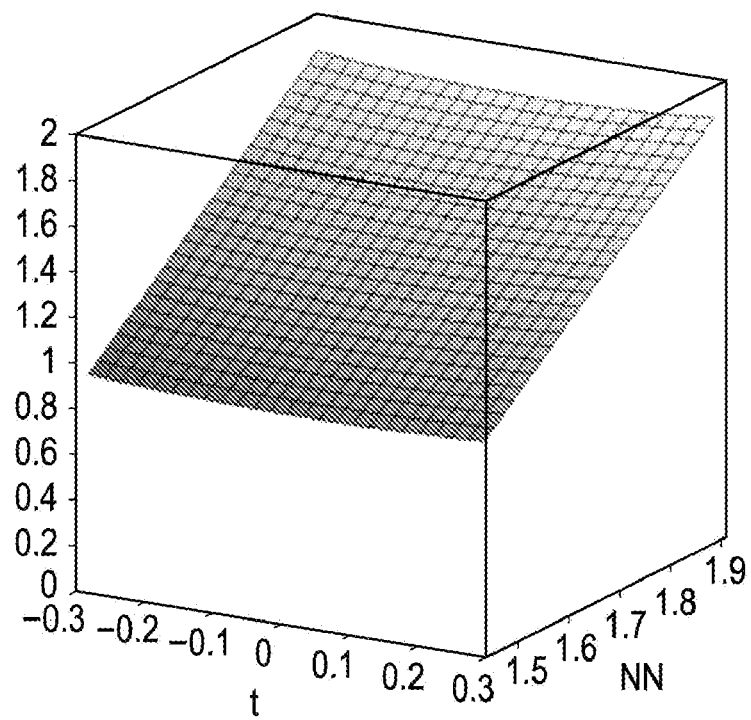
FIG. 16 is a drawing showing the relationship of (Numerical Formula 21).

When N=1, and making a graph of N' and $\theta$, FIG. 16 is obtained.

$\theta$ ranges from −0.3 rad to 0.3 rad (range of about ±17°). In this range:

$$2N'\sqrt{1 - \frac{N^2\sin^2\theta}{N'^2}} - 2N\cos\theta \qquad (21a)$$

From this, it is understood that the change in range of Numerical Formula 4 is sensitive more to the change in index of refraction N' than to the change in incident angle θ.

The value of the power φ changes according to cases, where air and a glass material can be arranged before and behind the surface and where the glass material and air can be arranged before and behind the surface, and the index of refraction of the glass material. When the glass material and air can be arranged before and behind the surface and the glass material is larger in size, the power φ is increased. From this, it is understood that although the radius of curvature is the same, the surface power is changed by the index of refraction of the glass material.

On the other hand, for largely changing the surface power, it can be necessary in some circumstances to increase the inclination of the curved surface so as to increase the change in curvature. Hence, with increasing change in power, the maximum value of the inclination tends to increase. From the above consideration, the range of the power changing due to the index of refraction is established as follows:
(Numerical Formula 22)

$$0 \text{ (degree mm)} \leq K_{max}/\Delta\phi \leq 3 \text{ (degree mm)}, \qquad (22)$$

where Δφ is the change in power of each face.

Figure 17:
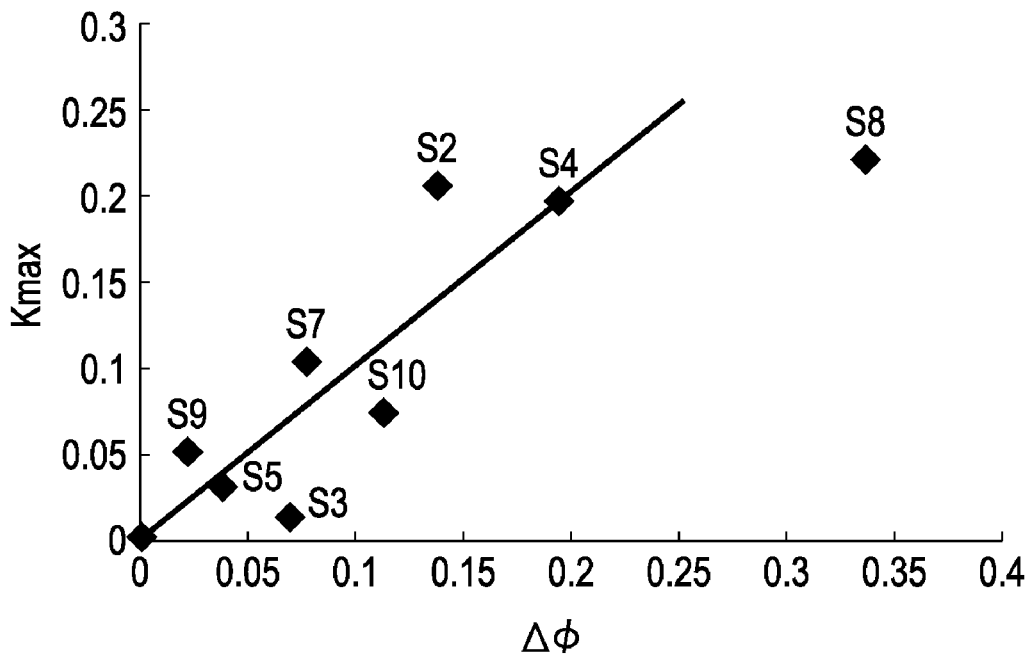
FIG. 17 is a drawing showing the relationship between Δφ and Kmax.

FIG. 17 illustrates the relationship between Kmax of each face according to the first exemplary embodiment and the power change Δφ.

The straight line shown in FIG. 17 can be expressed by:

$$K_{max} = \Delta\phi,$$

where both θ and θ' are zero, and both the indexes of refraction are 1.

The air and the glass material can be arranged before and behind the surface located above the straight line while the glass material and the air can be arranged before and behind the surface located below the straight line. Also, it is understood that with increasing index of refraction of the glass material, the power φ is increased so as to approach a straight line.

Figure 18:
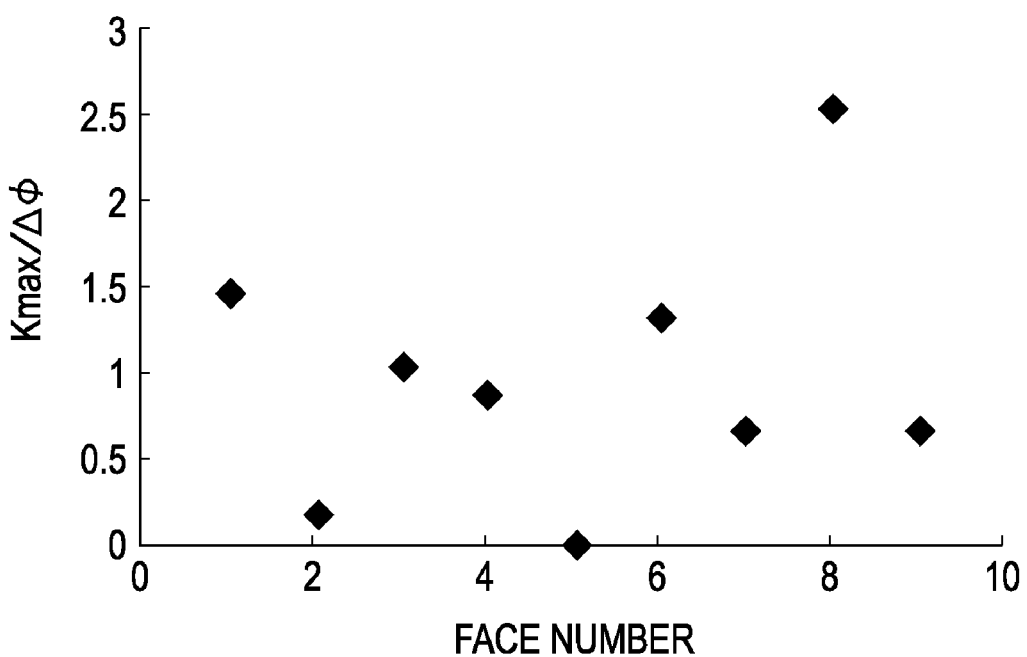
FIG. 18 is a drawing showing the changes in Kmax/Δφ relative to the face number.

FIG. 18 illustrates the value of Kmax/Δφ for each face. The inclination Kmax ranges from 0.16 to 2.5, so that it is understood that Numerical Formula 22 can be satisfied.

Figure 19:
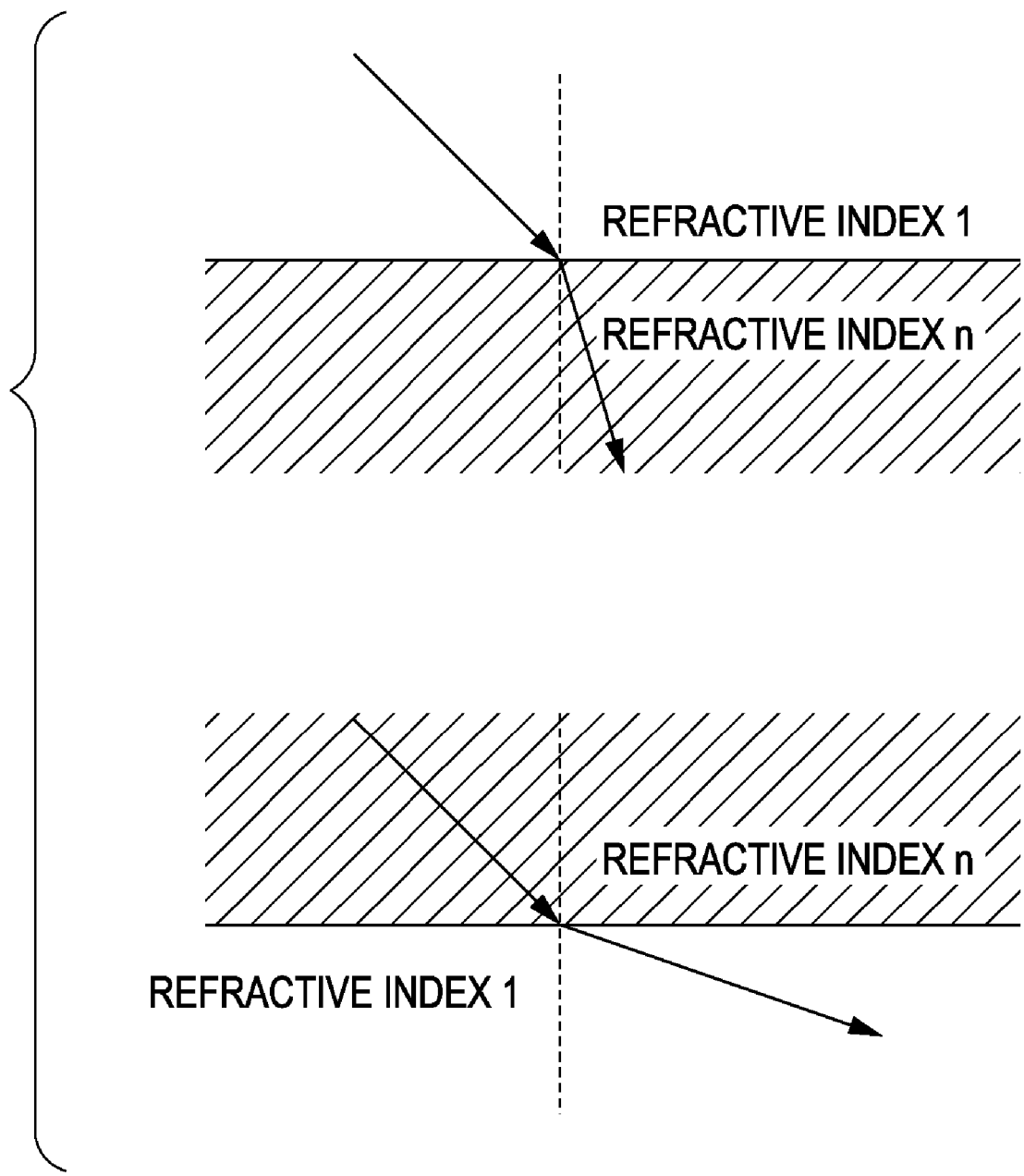
FIG. 19 is a drawing showing the difference in refracting direction.

Then, the inclination of the tangent for each face is shown in Table 11. Although the face has the same inclination, as illustrated in FIG. 19, a light proceeding direction is different due to the index of refraction n, so that it is determined by multiplying the inclination of the face, through which light emits from the material with a high index of refraction to that with a low index of refraction by −1. From the total sum, it is understood that Numerical Formula 18 can be satisfied.

Figure 20:
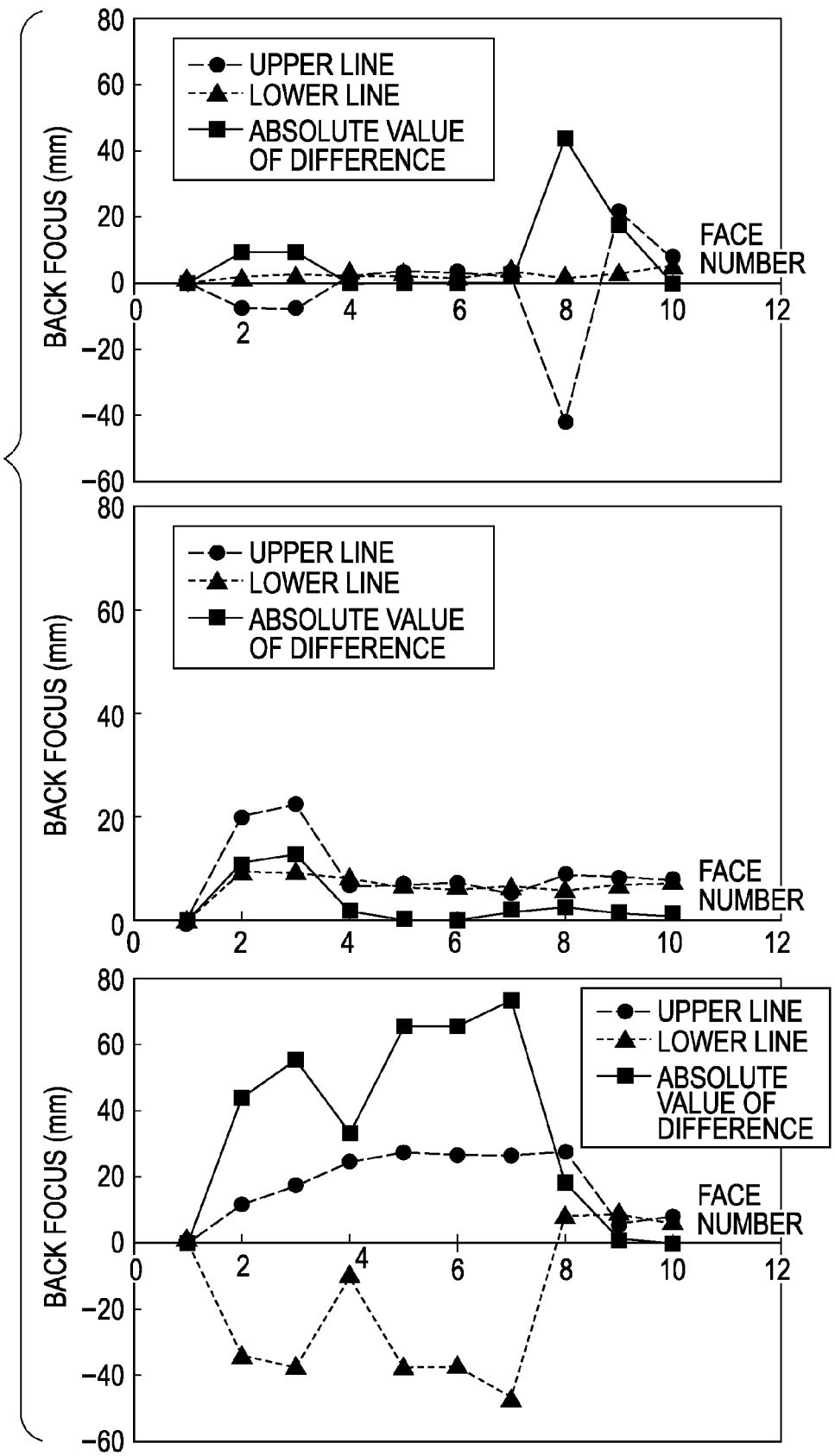
FIG. 20 includes drawings showing the displacement between an upper line and a lower line according to the first exemplary embodiment shown in FIG. 1.
Figure 21:
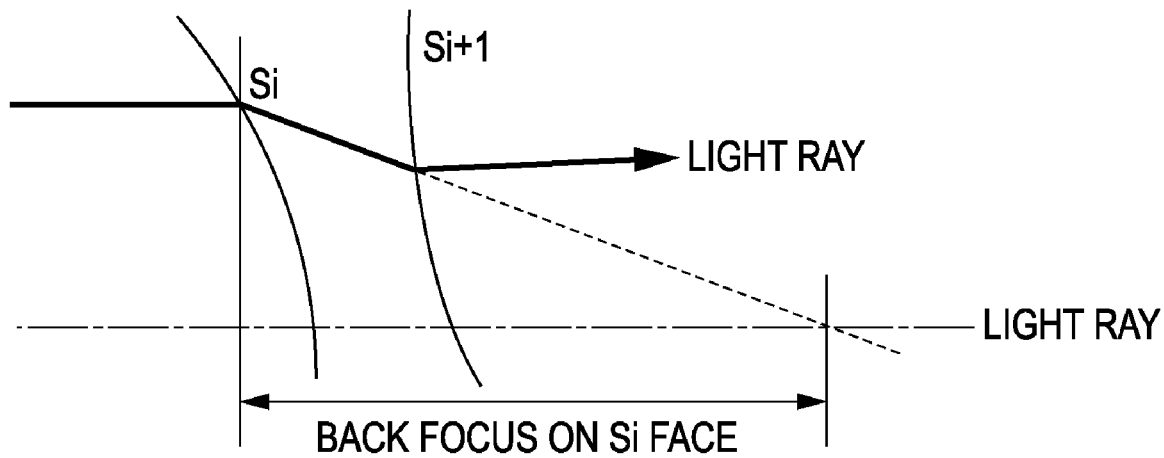
FIG. 21 is an explanatory view of the back focus on the face Si.

Next, in order to confirm that the tangent inclination at an intersection of each face and the optical axis reduces the axial coma, FIG. 20 illustrates the axial coma for each face. The face number is plotted in abscissa and the distance, as illustrated in FIG. 21, from the point where the upper and lower lines of light emitted from a face Si approach the optical axis to the face Si (light back focus) is plotted in ordinate. The direction from the object toward the image plane is designated as positive.

Since the face S6 is the diaphragm, it is understood that in any drawing of FIG. 20, the values of the back focus of the upper line and the lower line of the face S5 are the same as those of the face S6. The absolute value of difference shown in FIG. 20 means the absolute value of the back focus difference between the upper line and the lower line, and if it is zero, the upper line and the lower line focus at the same point so as not to generate the axial coma.

Referring to FIG. 20, the back focal distances of the upper line and the lower line of the tenth face, which is the final face of the rotationally asymmetric optical device, are substantially the same. Therefore, the axial coma is reduced, so that in the rear of the rotationally asymmetric lens, the light is equivalent to the coaxial system and the off-axial aberration does not remain. Accordingly, the auxiliary lens arranged adjacent to the image plane of the eccentric movable block need not to be rotationally asymmetric.

Furthermore, for zooming the system while maintaining the compactness, the principal point position can be largely moved from the position of the optical device. In a conventional optical device only with one cubic curved side, the principal point only exists on the cubic-curved face and does not largely move. A method for largely changing the principal point position includes the shaping a rotationally asymmetric optical device in meniscus by curving its one side.

Different from a biconvex lens and a biconcave lens, in a meniscus lens, the principal point can be located outside the lens. By adopting this shape also to a rotationally asymmetric lens, the principal point can be largely removed outside the lens.

However, when a rotationally asymmetric optical device is shaped in meniscus, at the telephoto end or the wide angle end (when light passes through an end of the optical device), the upper line of axial light is displaced from the lower line. Thus, this can be reduced with another optical device. A method for solving this includes the canceling the displacement between the upper and lower lines by shaping the optical device for correction in reversely inclined meniscus.

When introducing a face curved in a third order or higher, the order of coefficients can be determined by considering the above things. In at least one exemplary embodiment, the meniscus is shaped in a direction in that the distance between devices is reduced. This is because the axial coma can be reduced while minimizing the coma on each face by moving an optical device close to another.

The axial coma is reduced in a manner described above.

Figure 22:
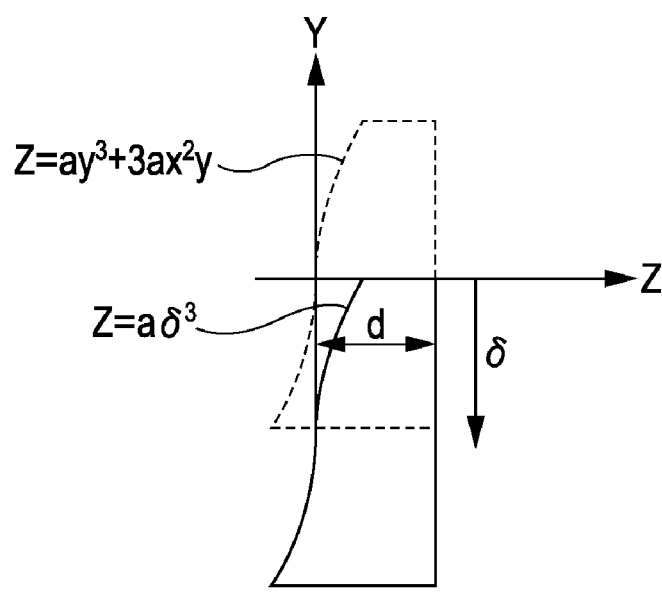
FIG. 22 is a drawing showing a lens shape, a lens thickness, and displacement.

If reference character δmax denotes the maximum displacement value when a rotationally asymmetric optical device with a face shaped according to Numerical Formula 10 is displaced in the Y axis direction by δ, the power of the optical device can be obtained from Numerical Formula 11. Under the condition that the edge thickness of the optical device becomes zero or more as illustrated in FIG. 22, the following equation is established:
(Numerical Formula 23)

$$a \times \delta_{max}3 \leq d, \qquad (23)$$

where d is the thickness of the optical device.

From Numerical Formula 23 and Numerical Formula 11, Numerical Formula 24 is obtained.

(Numerical Formula 24) (24)

$$\varphi_{max} = 12a(n-1)\delta_{max} \leq 12(n-1)\frac{d}{\delta_{max}^2}$$

When Numerical Formula 24 is further transformed, Numerical Formula 25 is obtained.

(Numerical Formula 25)

$$\varphi_{max}\delta_{max} \leq 12(n-1)\frac{d}{\delta_{max}} \quad (25)$$

Herein 12(n−1) is constant, so that the range of the product of the power $\varphi$max and the displacement $\delta$max is determined by d/$\delta$.

That is, it is determined by the ratio of the thickness of the optical device to the displacement. If the thickness d is increased, the power increases so as to increase the aberration. Conversely, if the power $\varphi$max is increased, the optical device increases in size. Then, in view of aberration correction and/or reduction and miniaturization, in at least one exemplary embodiment, d/$\delta$max can be 1 or less. According to the first exemplary embodiment, the thickness d is 0.5 mm, the displacement $\delta$max is about 1.34 mm, so that d/$\delta$=0.37<1. The above description is summarized as the following equation:

(Numerical Formula 26)

$$\delta \times \varphi < 6. \quad (26)$$

According to the first exemplary embodiment, when the product of the maximum displacement $\delta$ and the maximum power $\varphi$ is obtained, in the second group G2 at the wide angle end, $\delta$=−1.34358, $\varphi$=0.238784, and the product of $\delta$ and $\varphi$=0.32. These sufficiently satisfy the above range.

According to the embodiment and according to other exemplary embodiments below mentioned, focusing can be performed by moving the entire system or by moving one optical group in a direction perpendicular to the optical axis.

Second Exemplary Embodiment

FIG. 23 is a lens sectional view according to a second exemplary embodiment of the present invention. The specification is the same as that of the first exemplary embodiment. However, F-numbers at the telephoto end and at the middle zooming position are 8.5 and 6.4, respectively. The optical system includes seven optical devices in total. The optical devices E1a, E2a, E3a, E4a, E5a, and E6a sequentially arranged from the object side are rotationally asymmetric and are off-centered in the Y axis direction, and their eccentricity is changed continuously. The positive/negative sign condition of the eccentricity is reverse to each other and the absolute value is the same. The optical devices E3a, E4a, and E7a are rotationally symmetric spheres; however, if aberration asymmetric about the optical axis remains, they can also be rotationally asymmetric for eliminating the aberration.

The optical devices E1a and E2a constitute the first optical group G1a. Similarly, the optical devices E3a and E4a constitute the second optical group G2a; and the optical devices E5a and E6a constitute the third optical group G3a. Regarding to the face number, the reference surface, which is the origin of the absolute coordinate system, is designated as S0a; the first face of the optical device E1a is S1a; and sequentially designated as S2a, S3a, S4a, thereafter. After the face S6a (in the rear of the optical device E3a) there is an aperture stop S7a (SP). The first face of the optical device E4a is S8a, and thereafter, the faces are sequentially numbered, so that the image plane IP is designated as S16a. Rotationally asymmetric groups (G1a and G3a) continuously off-centered in the Y axis direction and a rotationally symmetric group (G2a, E7a) are referred to below as eccentric movable blocks and an auxiliary block, respectively. Since with only the eccentric movable blocks G1 and G3, the power is increased so that the aberration is difficult to be reduced, the auxiliary block G2a, E7a is provided.

Lens data according to the second exemplary embodiment are shown in Table 12. The displacement from the Z-axis in each optical device is shown in Table 13; and polynomial surface factors expressed by Numerical Formula 1 are shown in Table 14.

Figure 24:
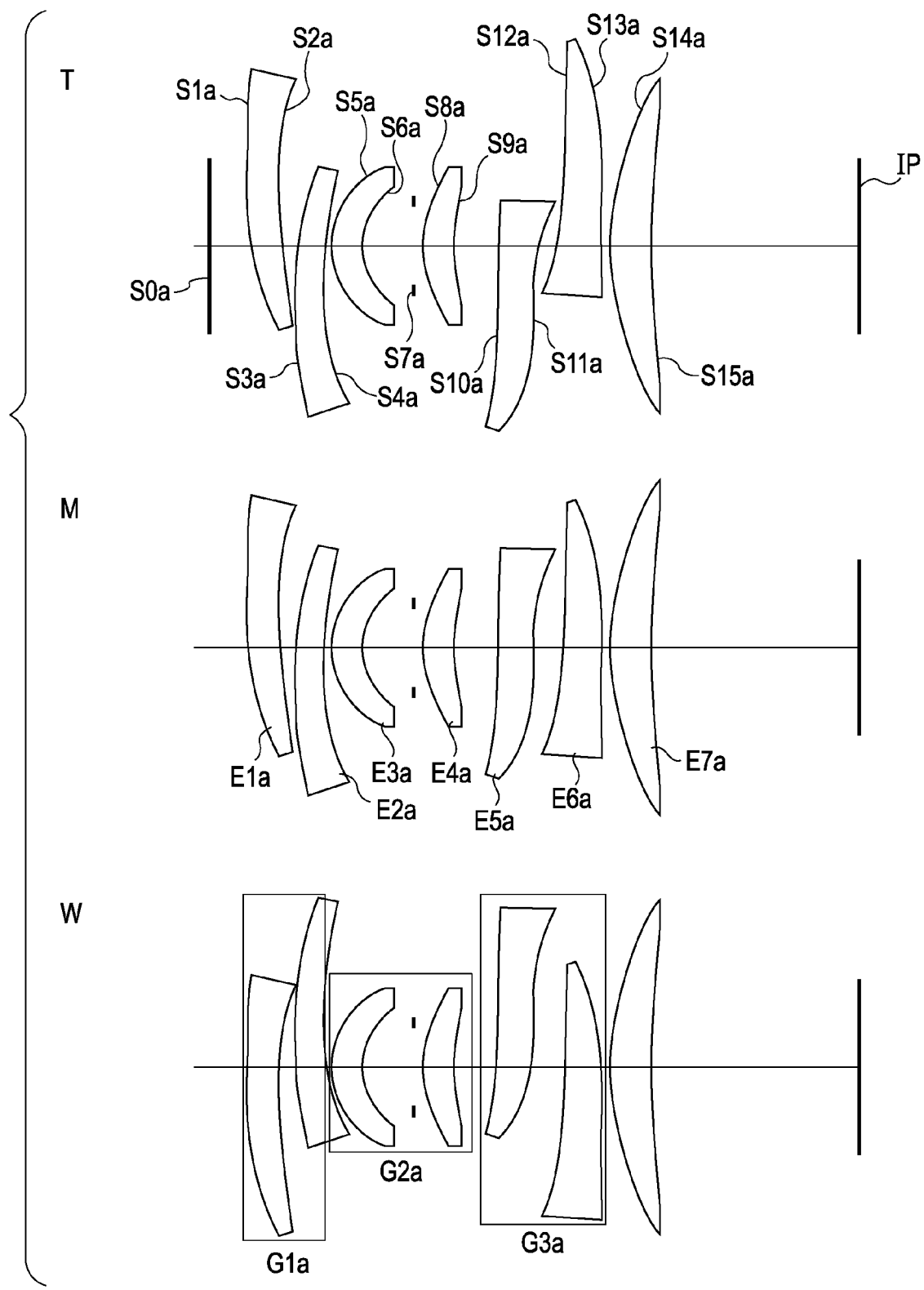
FIG. 24 includes lens sectional views at the telephoto end, the middle zooming position, and the wide angle end according to the second exemplary embodiment.

FIG. 24 is a light path diagram at this time, showing the telephoto end T, the middle zooming position M, and the wide angle end W arranged in that order. The optical devices E1a and E2a are off-centered in the Y axis direction, and the positive/negative sign condition of the eccentricity, as illustrated in Table 13, is reverse to each other and the absolute value is the same.

Thereby, the power of the first optical group G1a is changed from the positive to the negative. The light emitted from the first optical group G1a then passes through the aperture-stop S7a (SP) and the optical device E4a so as to enter the optical devices E5a and E6a. The optical devices E5a and E6a are off-centered in the Y axis direction, and the positive/negative sign condition of the eccentricity, as illustrated in Table 13, is reverse to each other and the absolute value is the same.

Thereby, the power of the second optical group G2a is changed from the negative to the positive. The light passed through the eccentric movable blocks G1a and G3a then enters the auxiliary block E7a, which covers the insufficient power of the eccentric movable blocks G1a and G3a. The light passed through these optical devices focuses without changing the image plane.

Figure 25A:
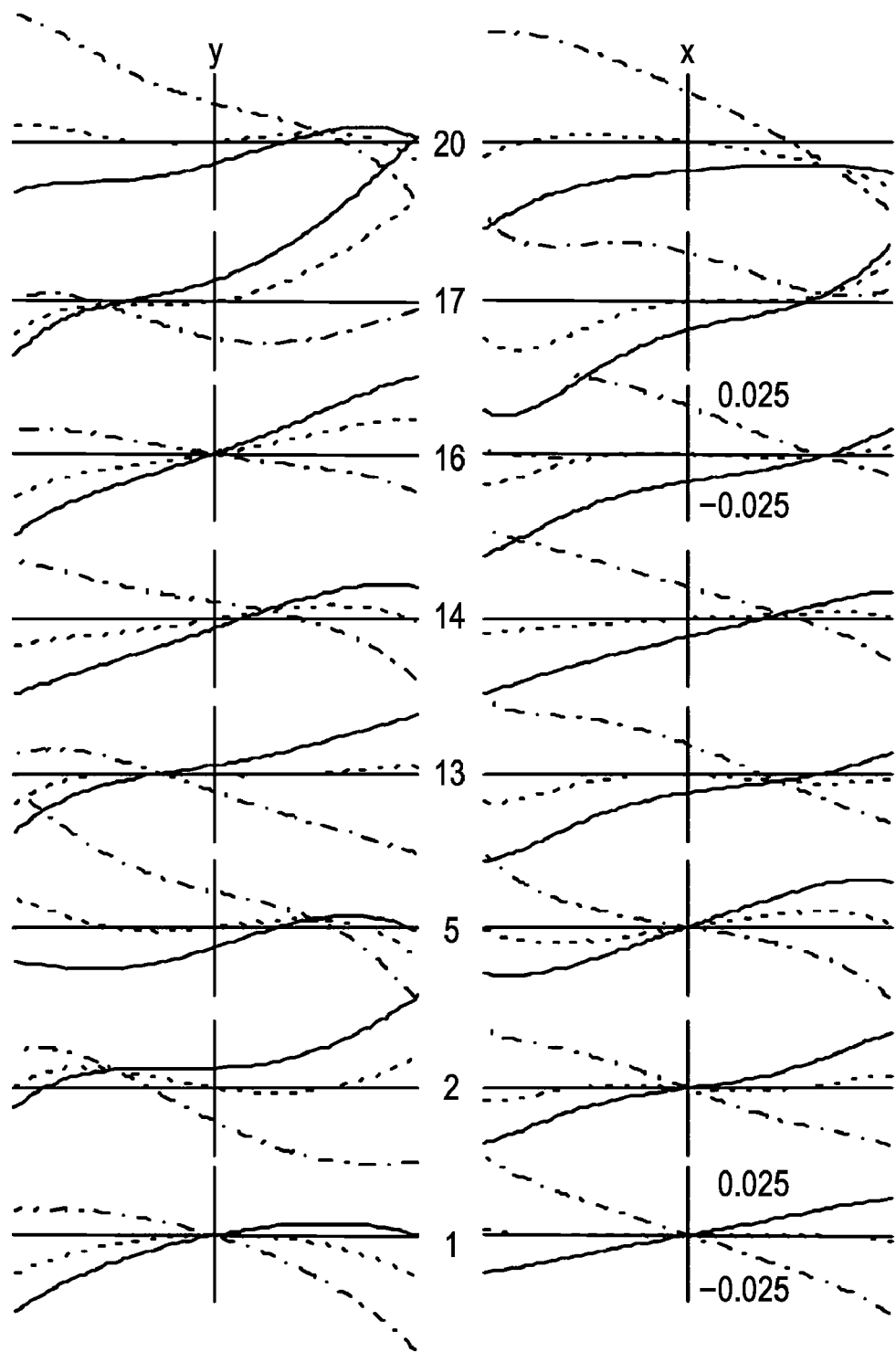
FIG. 25A includes aberration drawings according to the second exemplary embodiment for the telephoto end position.
Figure 25B:
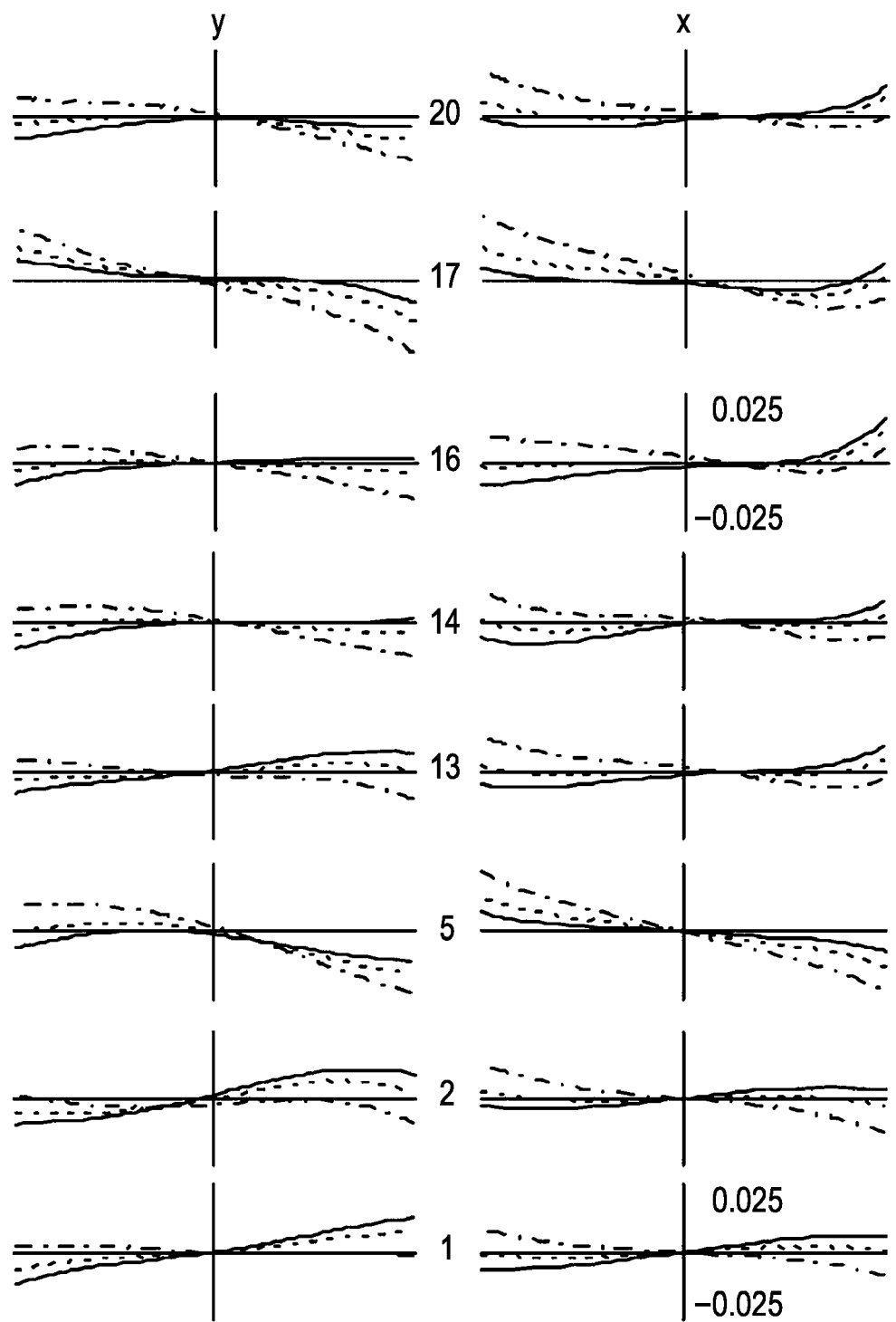
FIG. 25B includes aberration drawings according to the second exemplary embodiment for a middle position.
Figure 25C:
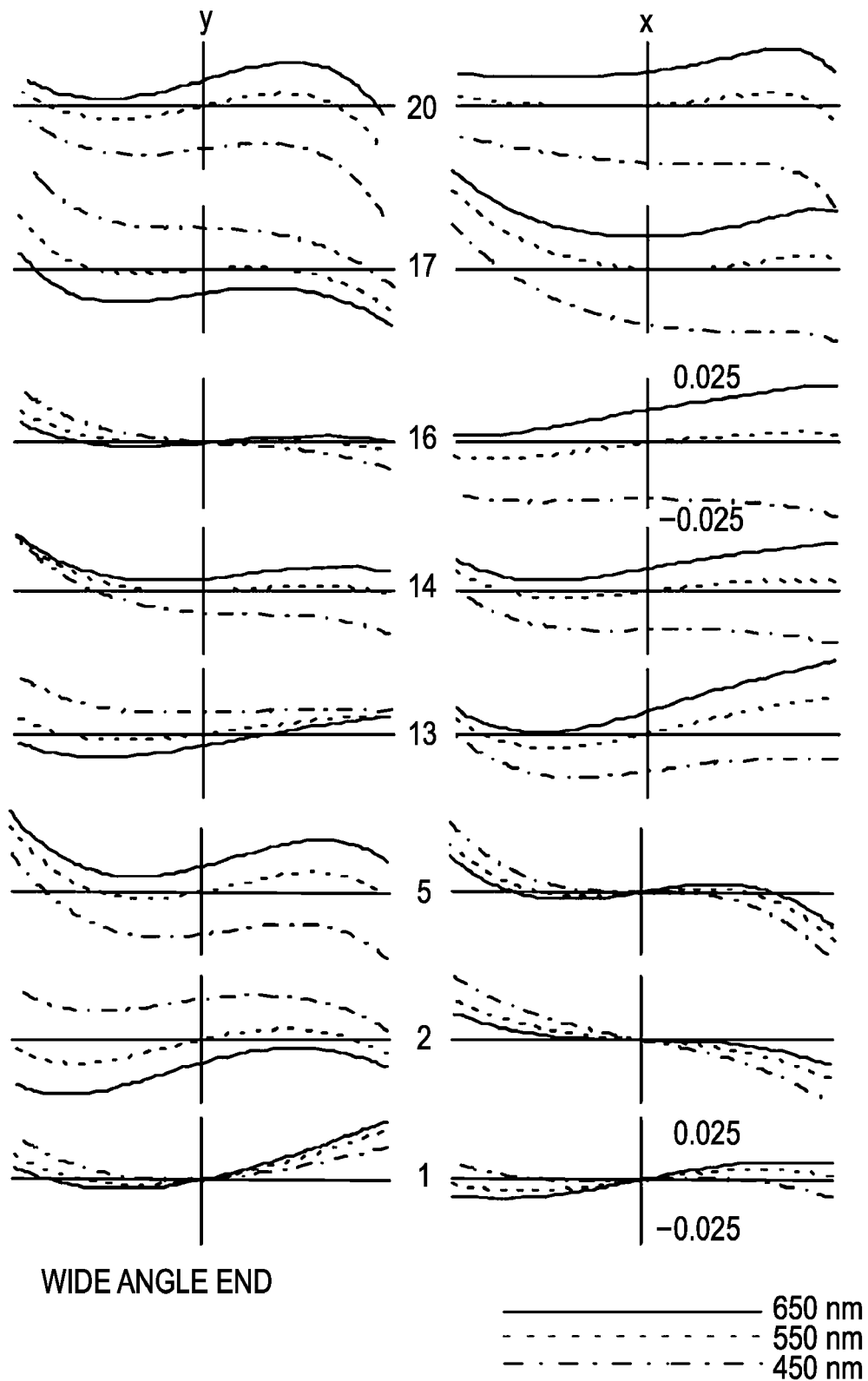
FIG. 25C includes aberration drawings according to the second exemplary embodiment for the wide angle end position.

FIGS. 25A to 25C are aberration diagrams at the telephoto end, the middle zooming position, and the wide angle end, respectively. The light position on the pupil is plotted in abscissa and the displacement from the principal light on the image plane in ordinate. The range of the ordinate is about ±20 µm. Numbers in FIGS. 25A to 25C are field angular numbers, and they are shown in FIG. 8 on the image plane. Since the data are symmetric with respect to the X axis, the positive side can be considered in the positive X axis direction.

Figure 26:
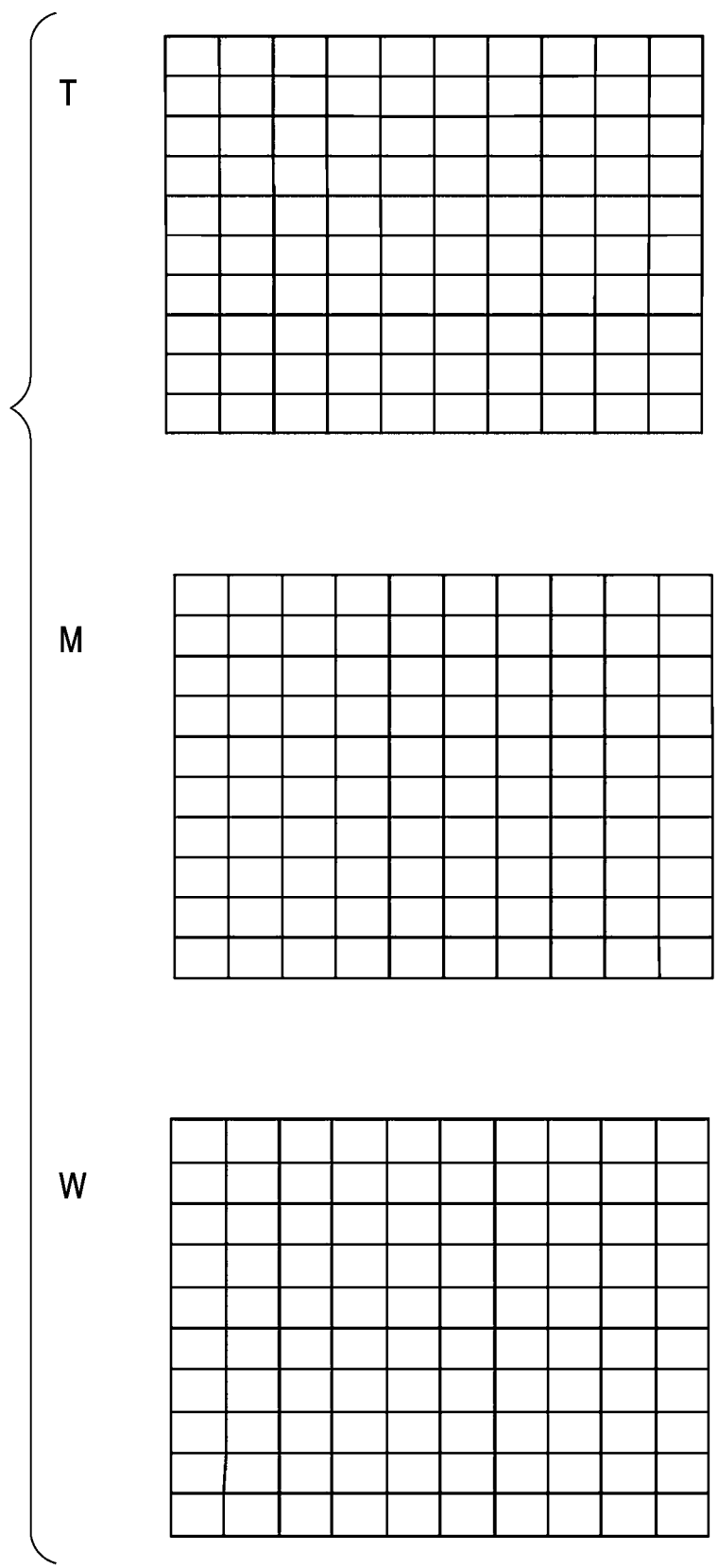
FIG. 26 includes distortion grating drawings at the telephoto end, the middle zooming position, and the wide angle end according to the second exemplary embodiment.

In the ray at a field angle of 0°, it is understood that coma be well corrected over the range from the telephoto end to the wide angle end. FIG. 26 shows distortion gratings. The grating has a ¼ inch-size (2.7 mm in length×3.6 mm in width). From this, it is understood that the distortions can also be suppressed satisfactorily.

Figure 27:
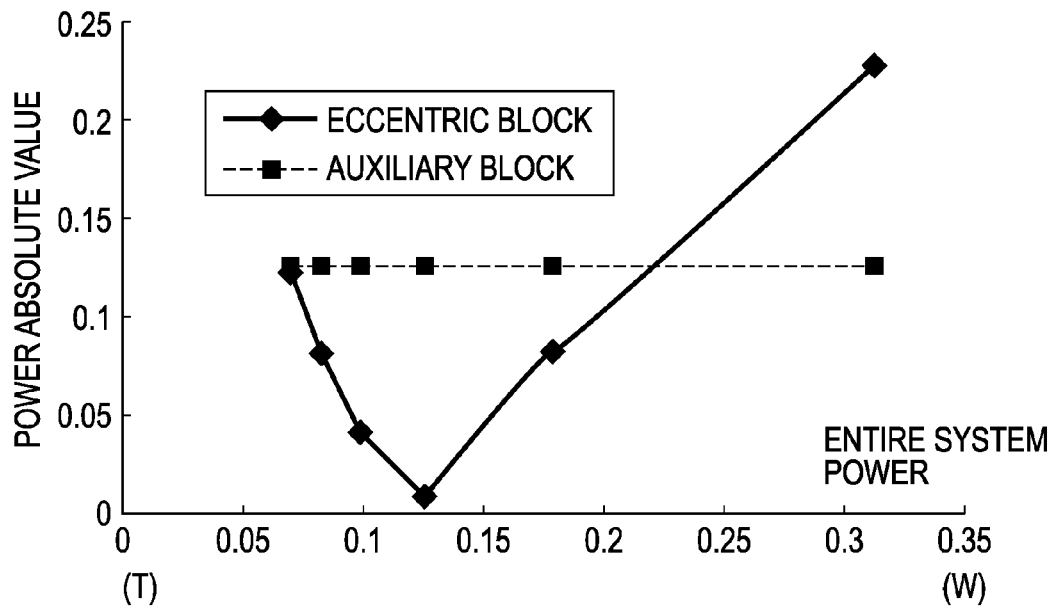
FIG. 27 is a drawing showing changes in power of an eccentric movable block and an auxiliary block according to the second exemplary embodiment.

FIG. 27 shows that the optical system is divided into the eccentric movable blocks G1a and G3a and the auxiliary block G2a, E7a so as to express the respective power absolute values relative to the power of the entire system. From this drawing, it is understood that the following condition can be satisfied:

$$|\varphi dt| \leq |\varphi st|,$$

where $|\varphi dt|$ is the power absolute value of the eccentric movable block and $|\varphi st|$ is the power absolute value of the auxiliary block at the telephoto end.

Figure 28:
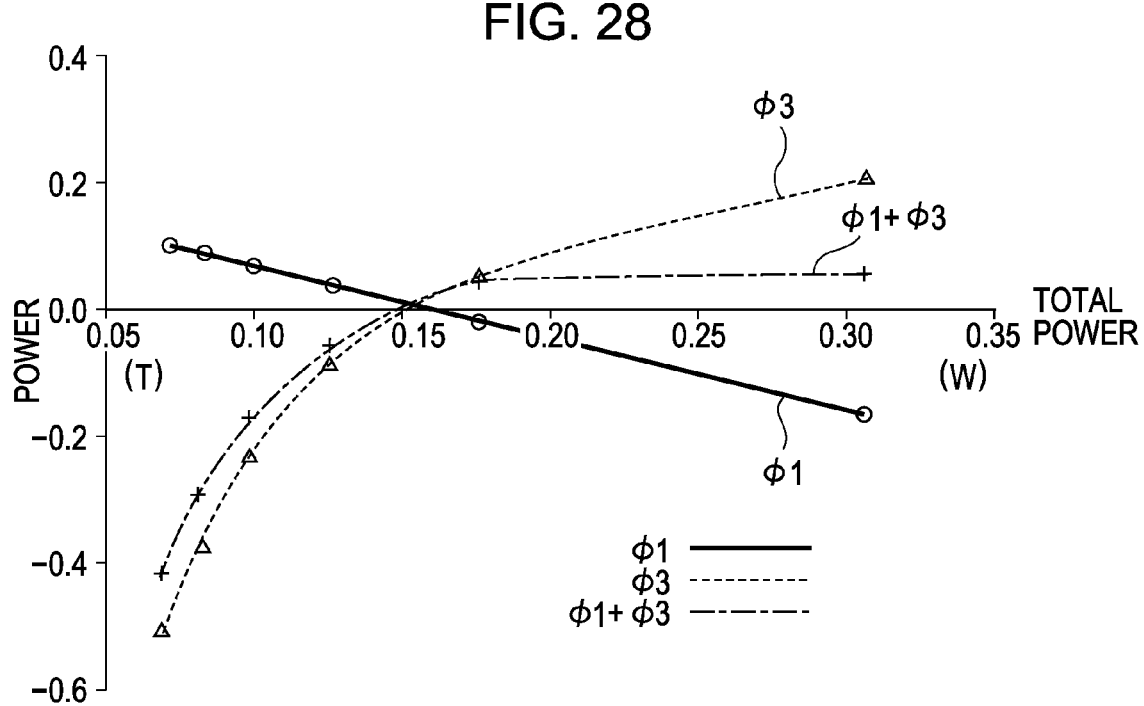
FIG. 28 is a drawing illustrating the changes in power of the first and second groups G1 and G2 according to the second exemplary embodiment.

FIG. 28 illustrates the changes in power for each group relative to the power of the entire system. From this drawing, with increasing power of the entire system, the eccentric movable block first group G1a changes in power from the positive to the negative; and the third group G3a changes in power from the negative to the positive.

The following condition can be satisfied:

|φgw|max<|φgt|min, where |φgw|max is the larger absolute value of the optical power at the position (W) where the optical power of the entire system is maximum, and |φgt|min is the smaller absolute value of the optical power at the position (T) where the optical power of the entire system is minimum.

Furthermore, the following condition can be satisfied:

−|φ|max≦φ13≦|φ|max, where |φ|max is the maximum value in the optical power absolute values of the first group G1$a$ and the third group G3$a$, and φ13=φ1+φ3 is the sum of the optical power of the first group G1$a$ and the third group G3$a$.

According to the second exemplary embodiment, when the product of the maximum values δ and φ is obtained, in the optical device E5$a$ at the telephoto end, δ=−1.22297, φ=−0.23732, and the product of these=0.29. These sufficiently satisfy the range of Numerical Formula 26.

Third Exemplary Embodiment

FIG. 29 is an explanatory drawing of a digital still camera using the zoom optical system according to the first exemplary embodiment as an image-pickup optical system. Referring to FIG. 29, reference numeral 20 denotes a camera body; numeral 21 an image-pickup optical system configured by the zoom optical system described with reference to FIG. 1; numeral 22 a solid-state image-pickup device (photoelectric transducer), such as a CCD sensor and a CMOS sensor, housed in the camera body for receiving object images formed by the image-pickup optical system; numeral 23 a memory for storing the information corresponding to the object images photo-electrically converted by the solid-state image-pickup device 22; and numeral 24 a finder which includes a liquid crystal display panel for observing object images formed on the solid-state image-pickup device 22.

In such a manner, by applying the zoom optical system according to at least one exemplary embodiment to an image-pickup apparatus such as a digital still camera, a compact image-pickup apparatus with excellent optical performances can be achieved.

As described above, according to at least one exemplary embodiment, the system is zoomed while well eliminating aberration by moving a rotationally asymmetric optical device in a direction different from the optical axis, as well as the system can be miniaturized.

Exemplary embodiments have been described above; the present invention is not obviously limited to these embodiments, so that various modifications can be made within the scope of its spirit.

As described above, according to exemplary embodiments of the present invention, the system is zoomed while well eliminating aberration so as to have a compact zoom optical system.

COMPARATIVE EXAMPLE 1

Figure 4:
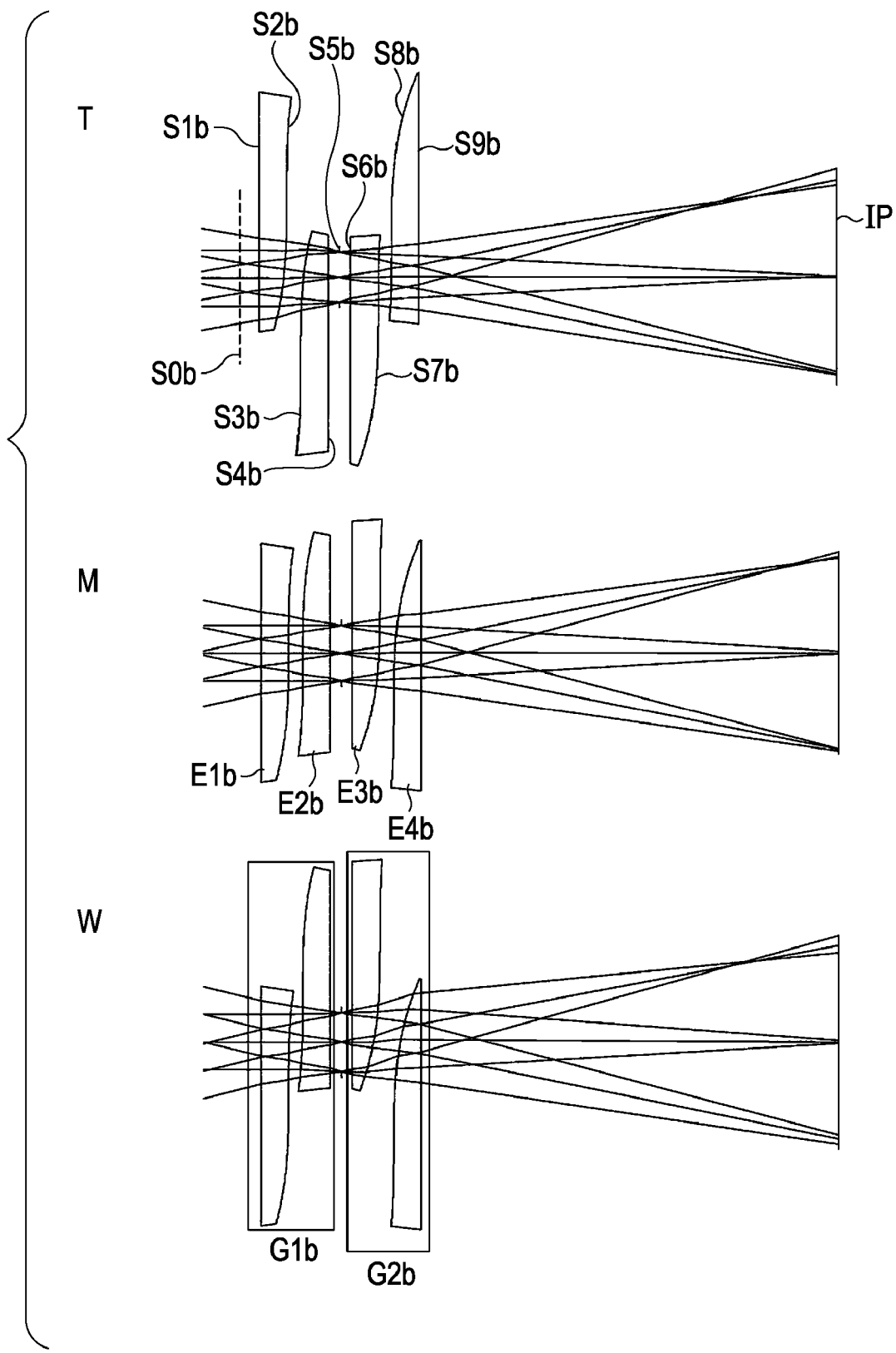
FIG. 4 includes lens sectional views designed on the basis of the comparative example 1.

Next, a comparative example 1 according to at least one exemplary embodiment will be described. The comparative example 1 is designed with reference to Japanese Patent Laid-Open No. H02-119103. FIG. 4 is a lens sectional view of the comparative example 1.

A zoom optical system of the comparative example 1, as illustrated in FIG. 4, which includes two optical groups G1$b$ and G2$b$, each including two rotationally asymmetric optical devices E1$b$ and E2$b$ (E3$b$ and E4$b$). The optical groups G1$b$ and G2$b$ are designated as a first group G1$b$ and a second group G2$b$ sequentially arranged from the object side. First, each group is approximated by one thin lens so as to perform paraxial computation. Then, the following equation can be satisfied:

(Numerical Formula 6) (6)

$$\phi = \frac{1}{f} = \phi_1 + \phi_2 - e\phi_1\phi_2$$

where $\phi_1$ and $\phi_2$ are the power of the first and second group G1$b$ and G2$b$, respectively; e is the principal distance; φ is the power of the entire system; and f is the focal distance.

The back focus $S_k$ is obtained by the paraxial computation from the following equation:

(Numerical Formula 7) (7)

$$S_k = \frac{1 - e\phi_1}{\phi}$$

When the principal distance e and the back focus $S_k$ are determined, from (Numerical Formula 6) and (Numerical Formula 7), the power $\phi_1$, $\phi_2$ can be expressed by a function of the power of the entire system φ. That is, the trajectories of changes in power of the first and second groups G1$b$ and G2$b$ relative to the change in power of the entire system can be expressed. Then, when the principal distance e=3 and the back focus $S_k$=15, the power $\phi_1$, $\phi_2$ can be expressed as follows:

(Numerical Formula 8) (8)

$$\phi_1 = -5\varphi + \frac{1}{3},$$

(Numerical Formula 9) (9)

$$\phi_2 = \frac{1}{45\varphi} - \frac{2}{5}.$$

Figure 3:
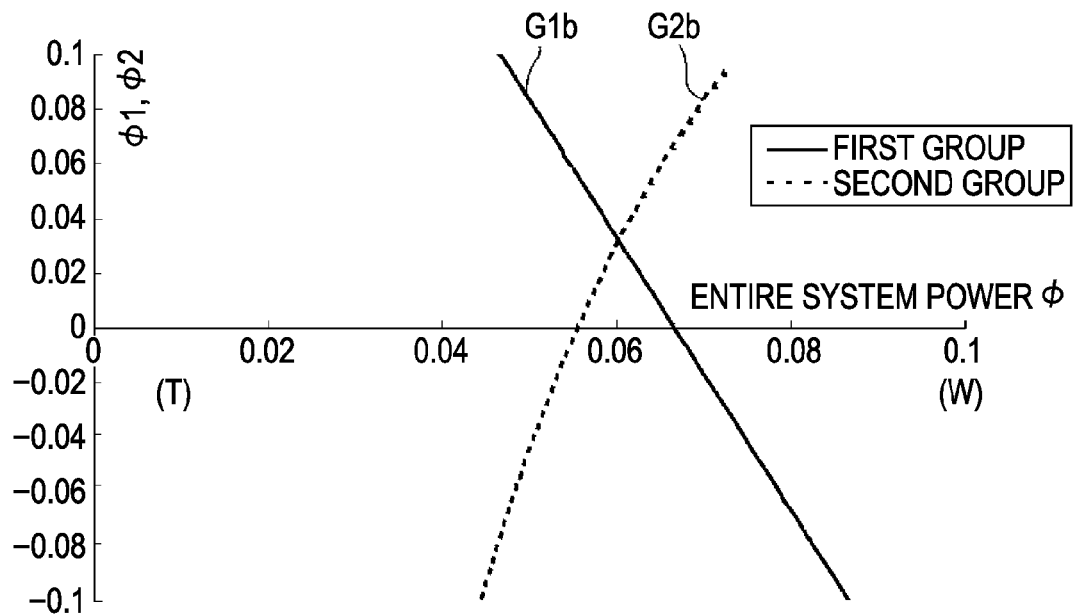
FIG. 3 is a drawing showing a lens power arrangement designed on the basis of the comparative example 1.

FIG. 3 is a graph showing the relationship between the power $\phi_1$, $\phi_2$ and the power φ of the entire system. From the graph, it is understood that with increasing power φ of the entire system, the first group G1$b$ changes in power from the positive to the negative and the second group G2$b$ reversely changes in power from the negative to the positive. The rotationally asymmetric curved surface can be expressed by (Numerical Formula 10) and the relationship between its factor a and the power can be expressed by (Numerical Formula 11):

(Numerical Formula 10)

$$z=ay^3+3ax^2y, \qquad (10)$$

(Numerical Formula 11)

$$\phi=12a\delta(n-1), \qquad (11)$$

where x, y, and z are the axes mentioned above; δ is the displacement of the two rotationally asymmetric optical devices E1$b$ and E2$b$ (E3$b$ and E4$b$) from the Z axis to the Y axis direction; and n is the index of refraction of the lens.

The factors a and n of the rotationally asymmetric optical devices E1$b$ to E4$b$ are shown in Table 1 as well as the displacements δ from the Z axis are shown in an order of the displacement at the telephoto end, the middle zooming position, and the wide angle end. The types and the spaces between faces of the faces S0$b$ to S9$b$ are shown in Table 2.

Referring to FIG. 4, the light incident in the reference surface S0b first enters the first group G1b. The first group G1b includes the two optical devices (lenses) E1b and E2b, and the sequentially numbered faces are S1b to S4b. The optical devices E1b and E2b are off-centered in the Y axis direction and their eccentricity is changed continuously. The positive/negative sign condition of the eccentricity is reverse to each other and the absolute value is the same. Thereby, the power $\phi_1$ of the first group G1b, as illustrated in FIG. 3, is changed from the positive to the negative during zooming from the telephoto end to the wide angle end (the zooming direction is the same below). The light emitted from the first group passes through the aperture stop S5b so as to enter the second group G2b. The second group G2b, in the same way as in the first group G1b, includes the two optical devices E3b and E4b, and the sequentially numbered faces are S6b to S9b. The optical devices E3b and E4b are off-centered in the Y axis direction and their eccentricity is changed continuously. The positive/negative sign condition of the eccentricity is reverse to each other and the absolute value is the same. Thereby, the power $\phi_2$ of the second group G2b, as illustrated in FIG. 3, is changed from the negative to the positive.

The light passed through these groups G1b and G2b focuses without changing the image plane IP. However, from the image plane, it is understood that although light focuses, aberration is largely generated.

The aberration is generated despite the paraxial arrangement according to Numerical Formula 8 and Numerical Formula 9. For example, the coma generated on the axis cannot be reduced only by the paraxial arrangement. Thus, in the comparative example 1, the aberration cannot be sufficiently corrected by the following reasons:

(a) The optical system including the rotationally asymmetric optical device is asymmetric about the optical axis, so that the upper line is displaced from the lower line so as to generate the coma also in axial light.
(b) The curvature of field is generated.

According to the exemplary embodiments of the present invention, the system at the telephoto end can satisfy the condition:

$$|\phi dt| \leq |\phi st|,$$

where $|\phi dt|$ is the absolute value of the power total sum of a plurality of the optical groups with variable optical power, and $|\phi st|$ is the absolute value of the power total sum of the at least one optical group.

According to the exemplary embodiments of the present invention, for the zooming with the optical devices sequentially arranged from the diaphragm to the image side in an order of the device with positive refractive power and the device with negative refractive power, a zoom optical system capable of sufficiently eliminating and/or reducing aberration is achieved by providing an immovable optical group for the zooming.

TABLE 1

| | a: 4.0000E−03 | | | |
|---|---|---|---|---|
| | n: 1.51742 | | | |
| | DISPLACEMENT δ | | | |
| | E1 | E2 | E3 | E4 |
| TELE END | 3.00 mm | −3.00 mm | 1.18 mm | 1.18 mm |
| MIDDLE | 0.29 mm | −0.29 mm | 2.18 mm | −2.18 mm |
| WIDE END | −1.65 mm | 1.65 mm | 3.89 mm | −3.89 mm |

TABLE 2

| | FACE TYPE | SPACE |
|---|---|---|
| OBJECT FACE | | INFINITE |
| S0 REFERENCE FACE | | 0 |
| S1 | FLAT FACE | 1 |
| S2 | POLYNOMIAL FACE | 0.5 |
| S3 | POLYNOMIAL FACE | 1 |
| S4 | FLAT FACE | 0.4 |
| S5 DIAPHRAGM FACE | | 0.4 |
| S6 | FLAT FACE | 1 |
| S7 | POLYNOMIAL FACE | 0.5 |
| S8 | POLYNOMIAL FACE | 1 |
| S9 | FLAT FACE | |

TABLE 3

| | FACE TYPE | SPACE | MATERIAL |
|---|---|---|---|
| OBJECT FACE | | INFINITE | |
| REFERENCE FACE s0 | | 0 | |
| s1 | POLYNOMIAL FACE | 0.5 | S-BAL41 |
| s2 | POLYNOMIAL FACE | 0.1 | |
| s3 | POLYNOMIAL FACE | 0.1 | S-LAM59 |
| s4 | POLYNOMIAL FACE | 0 | |
| DIAPHRAGM FACE s5 | | 0 | |
| s6 | POLYNOMIAL FACE | 0.5 | S-LAM60 |
| s7 | POLYNOMIAL FACE | 0.3 | |
| s8 | POLYNOMIAL FACE | 0.5 | S-LAM59 |
| s9 | POLYNOMIAL FACE | 0.2 | |
| s10 | ROTATIONALLY SYMMETRIC ASPHERE | 0.5 | S-FSL5 |
| s11 | ROTATIONALLY SYMMETRIC ASPHERE | 1.758954358 | |
| s12 | ROTATIONALLY SYMMETRIC ASPHERE | 0.5 | S-FSL5 |
| s13 | ROTATIONALLY SYMMETRIC ASPHERE | 0.460489246 | |
| s14 | FLAT FACE | 0.3 | |
| s15 | FLAT FACE | 0.2 | |
| s16 | FLAT FACE | 0.5 | |
| IMAGE PLANE | | 0 | |

TABLE 4

| | DISPLACEMENT | | |
|---|---|---|---|
| LENS NO. | TELE END | MIDDLE | WIDE END |
| E1 | 1.07833 | 0.08916 | −0.58315 |
| E2 | −1.07833 | −0.08916 | 0.58315 |
| E3 | −1.34358 | −0.27756 | 0.44509 |
| E4 | 1.34358 | 0.27756 | −0.44509 |

TABLE 5

| s10 | CURVATURE RADIUS | −3 |
|---|---|---|
| | A | −7.75E−03 |
| | B | −2.03E−02 |
| s11 | CURVATURE RADIUS | −1.3829 |
| | A | 4.30E−02 |
| | B | 2.95E−03 |

TABLE 5-continued

| | | | |
|---|---|---|---|
| s12 | CURVATURE RADIUS | 84.06001 | |
| | A | 3.39E−02 | |
| | B | −9.96E−03 | |
| s13 | CURVATURE RADIUS | 2.967489 | |
| | A | 3.20E−03 | |
| | B | −5.34E−03 | |

TABLE 6

| | | | | | | | |
|---|---|---|---|---|---|---|---|
| 2 | C02 | 6.59E−02 | C03 | −1.60E−02 | C04 | −1.57E−03 | |
| | C05 | −4.27E−04 | C06 | −3.77E−05 | C20 | 5.14E−02 | |
| | C21 | −8.18E−02 | C22 | 1.78E−02 | C23 | 1.55E−02 | |
| | C24 | 4.32E−03 | C40 | −1.91E−02 | C41 | 3.84E−03 | |
| | C42 | 7.77E−03 | C60 | 1.04E−02 | | | |
| 3 | C02 | 5.05E−03 | C03 | 3.31E−03 | C04 | 6.12E−04 | |
| | C05 | 1.06E−03 | C06 | 2.40E−04 | C20 | −2.08E−02 | |
| | C21 | −4.27E−02 | C22 | 3.99E−02 | C23 | 3.32E−02 | |
| | C24 | 5.75E−03 | C40 | 1.88E−03 | C41 | 1.09E−02 | |
| | C42 | 8.73E−03 | C60 | 3.84E−02 | | | |
| 4 | C02 | 4.31E−02 | C03 | 3.60E−02 | C04 | −6.11E−03 | |
| | C05 | 6.82E−04 | C06 | 1.94E−04 | C20 | −9.43−03 | |
| | C21 | 9.28E−02 | C22 | −2.57E−02 | C23 | −2.41E−03 | |
| | C24 | 1.29E−02 | C40 | 4.80E−03 | C41 | −4.08E−02 | |
| | C42 | 1.85E−02 | C60 | 5.50E−03 | | | |
| 5 | C02 | −6.28E−03 | C03 | 1.46E−02 | C04 | 2.76E−04 | |
| | C05 | −1.37E−03 | C06 | 2.17E−04 | C20 | −3.35E−02 | |
| | C21 | 1.20E−02 | C22 | 1.33E−02 | C23 | −8.82E−03 | |
| | C24 | 6.36E−03 | C40 | 3.50E−02 | C41 | −1.41E−01 | |
| | C42 | 3.92E−02 | C60 | −3.15E−02 | | | |
| 7 | C02 | 6.05E−03 | C03 | 8.00E−03 | C04 | 5.33E−03 | |
| | C05 | 5.07E−04 | C06 | −6.67E−04 | C20 | 2.25E−02 | |
| | C21 | 9.89E−03 | C22 | 3.56E−02 | C23 | 1.57E−02 | |
| | C24 | −1.90E−02 | C40 | −5.32E−02 | C41 | −6.30E−02 | |
| | C42 | 1.02E−03 | C60 | −1.31E−02 | | | |
| 8 | C02 | 2.32E−03 | C03 | 3.60E−02 | C04 | 1.03E−03 | |
| | C05 | 1.66E−03 | C06 | −4.20E−04 | C20 | −4.55E−02 | |
| | C21 | 1.06E−01 | C22 | 1.81E−02 | C23 | 1.54E−02 | |
| | C24 | −1.43E−02 | C40 | −1.00E−01 | C41 | 1.96E−02 | |
| | C42 | −1.07E−02 | C60 | 3.53E−02 | | | |
| 9 | C02 | 2.88E−03 | C03 | 2.11E−02 | C04 | 7.24E−03 | |
| | C05 | 4.43E−04 | C06 | −2.59E−04 | C20 | −4.52E−02 | |
| | C21 | 1.26E−02 | C22 | 5.97E−02 | C23 | 3.14E−02 | |
| | C24 | −1.75E−03 | C40 | −3.65E−02 | C41 | 1.25E−03 | |
| | C42 | −4.47E−03 | C60 | 3.60E−02 | | | |
| 10 | C02 | 2.42E−03 | C03 | −1.39E−02 | C04 | 6.88E−03 | |
| | C05 | 5.88E−04 | C06 | 5.69E−05 | C20 | 8.48E−03 | |
| | C21 | −3.70E−02 | C22 | 4.42E−02 | C23 | 2.52E−02 | |
| | C24 | 1.58E−03 | C40 | 5.72E−03 | C41 | 3.37E−04 | |
| | C42 | −2.975−03 | C60 | 8.63E−03 | | | |

TABLE 8

| | FIRST GROUP | SECOND GROUP | ENTIRE SYSTEM |
|---|---|---|---|
| TELE END | 0.990678 | −0.37582 | 0.614858 |
| MIDDLE | 0.074878 | 0.598341 | 0.673219 |
| WIDE END | −0.37498 | 1.036717 | 0.661737 |

TABLE 9

| FOCAL LENGTH | TELE END | MIDDLE | WIDE END |
|---|---|---|---|
| PRINCIPAL DISTANCE | 0.027587 | 0.379922 | −0.04262 |

TABLE 10

| FOCAL LENGTH | TELE END | MIDDLE | WIDE END |
|---|---|---|---|
| PRINCIPAL DISTANCE | 0.020994 | 0.036047 | 0.041308 |

TABLE 11

| | TELE END | MIDDLE | WIDE END |
|---|---|---|---|
| S1 | −0.20264 | −0.01256 | 0.060318 |
| S2 | −2.97E−03 | 8.31E−04 | −1.08E−02 |
| S3 | 0.195687 | 0.008496 | −0.00876 |
| S4 | −3.12E−02 | 7.73E−04 | −2.10E−02 |
| S5 | −2.1E−31 | 4.9E−32 | 1.22E−30 |
| S6 | 0.102096 | 0.005675 | −0.00234 |
| S7 | −0.21847 | −0.00966 | −0.01947 |
| S8 | 0.050997 | 0.00269 | 0.017836 |
| S9 | 7.16E−02 | 2.23E−03 | −3.88E−03 |
| TOTAL | −0.03493 | −0.00152 | 0.011921 |

TABLE 7

| | E1 | E2 | G1 | E3 | E4 | G2 | ECCENTRIC MOVABLE BLOCK | E5 | E6 | AUXILIARY BLOCK | ENTIRE SYSTEM |
|---|---|---|---|---|---|---|---|---|---|---|---|
| TELE END | 0.503426 | 0.455159 | 0.958585 | −0.36544 | −0.72921 | −1.09464 | −0.136057518 | 0.922937 | −0.76976 | 0.153178087 | 0.017121 |
| MIDDLE | 0.264618 | 0.123323 | 0.387941 | 0.177193 | −0.26423 | −0.08703 | 0.300908608 | 0.619076 | −0.51633 | 0.102746923 | 0.403656 |
| WIDE END | 0.196862 | 0.007608 | 0.20447 | 0.293235 | −0.18407 | 0.109164 | 0.313634309 | 0.57769 | −0.48181 | 0.095878098 | 0.409512 |

TABLE 12

| | FACE TYPE | CURVATURE RADIUS | SPACE | REFRACTING INDEX | Abbe NO. |
|---|---|---|---|---|---|
| OBJECT FACE REFERENCE FACE s0 | | | 0 | | |
| s1 | POLYNOMIAL FACE | | 0.5 | 1.538604 | 65.5527 |
| s2 | POLYNOMIAL FACE | | 0.3 | | |
| s3 | POLYNOMIAL FACE | | 0.5 | 1.589647 | 62.0231 |
| s4 | POLYNOMIAL FACE | | 0.1 | | |
| s6 | SPHERE | 0.712795 | 0.5 | 1.48749 | 70.4058 |
| s7 | SPHERE | 0.853974 | 0.929661 | | |
| DIAPHRAGM FACE s8 | | | 0.251098 | | |
| s9 | SPHERE | 0.452264 | 0.5 | 1.48749 | 70.4058 |
| s10 | SPHERE | 0.246629 | 0.819241 | | |
| s11 | POLYNOMIAL FACE | | 0.6 | 1.62041 | 60.3236 |
| s12 | POLYNOMIAL FACE | | 0.5 | | |
| s13 | POLYNOMIAL FACE | | 0.6 | 1.62041 | 60.3236 |
| s14 | POLYNOMIAL FACE | | 0.2 | | |
| s15 | SPHERE | 0.19521 | 0.7 | 1.48749 | 70.4058 |
| s16 | SPHERE | 0.05331 | 3 | | |
| IMAGE PLANE | | | | | |

TABLE 13

| | DISPLACEMENT | | |
|---|---|---|---|
| LENS NO. | TELE END | MIDDLE | WIDE END |
| E1 | 0.89952 | 0.49385 | −0.60408 |
| E2 | −0.89952 | −0.49385 | 0.60408 |
| E5 | −1.22297 | −0.29356 | 0.58002 |
| E6 | 1.22297 | 0.29356 | −0.58002 |

TABLE 14

| S1 | C2: | 7.25E−02 | C3: | −2.17E−02 | C4: | −6.26E−03 |
|---|---|---|---|---|---|---|
| | C5: | 1.22E−03 | C6: | 5.61E−04 | C20: | 1.44E−01 |
| | C21: | −4.85E−02 | C22: | −1.05E−02 | C23: | −1.59E−03 |
| | C24: | 1.95E−03 | C40: | 2.90E−04 | C41: | 1.37E−03 |
| | C42: | 2.20E−03 | C60: | −4.96E−04 | | |
| S2 | C2: | 8.88E−02 | C3: | 4.58E−02 | C4: | −6.74E−03 |
| | C5: | 1.68E−03 | C6: | 6.93E−04 | C20: | 1.41E−01 |
| | C21: | 1.98E−02 | C22: | −1.06E−02 | C23: | −1.32E−03 |
| | C24: | 1.47E−03 | C40: | 1.08E−02 | C41: | 6.24E−03 |
| | C42: | 2.97E−03 | C60: | −7.26E−04 | | |
| S3 | C2: | 4.49E−02 | C3: | 5.69E−02 | C4: | 6.07E−03 |
| | C5: | 2.35E−04 | C6: | −4.21E−05 | C20: | 1.02E−01 |
| | C21: | −2.38E−02 | C22: | 4.02E−02 | C23: | 2.44E−03 |
| | C24: | −4.75E−03 | C40: | 2.87E−03 | C41: | −3.42E−03 |
| | C42: | −7.96E−03 | C60: | −1.15E−03 | | |
| S4 | C2: | 6.12E−02 | C3: | −2.26E−02 | C4: | 1.06E−03 |
| | C5: | −1.41E−03 | C6: | 5.87E−05 | C20: | 1.71E−01 |
| | C21: | −1.38E−01 | C22: | 7.36E−02 | C23: | −1.47E−02 |
| | C24: | −2.46E−03 | C40: | 3.38E−02 | C41: | −2.19E−02 |
| | C42: | −4.05E−03 | C60: | −1.28E−03 | | |
| S11 | C2: | −2.00E−02 | C3: | 2.91E−02 | C4: | 6.76E−03 |
| | C5: | −2.34E−03 | C6: | −2.23E−03 | C20: | 1.19E−02 |
| | C21: | 8.79E−03 | C22: | 6.91E−02 | C23: | −1.83E−02 |
| | C24: | −1.06E−02 | C40: | 2.13E−02 | C41: | −2.43E−02 |
| | C42: | −2.76E−02 | C60: | −6.62E−03 | | |
| S12 | C2: | −4.15E−02 | C3: | 7.74E−02 | C4: | 8.72E−03 |
| | C5: | −1.55E−03 | C6: | −2.17E−03 | C20: | −1.00E−01 |
| | C21: | 1.58E−01 | C22: | 2.16E−02 | C23: | −1.26E−02 |

TABLE 14-continued

| | C24: | −9.10E−03 | C40: | 6.61E−03 | C41: | −2.38E−02 |
|---|---|---|---|---|---|---|
| | C42: | −1.94E−02 | C60: | −1.42E−03 | | |
| S13 | C2: | −5.49E−03 | C3: | 3.23E−02 | C4: | −1.21E−02 |
| | C5: | −1.63E−03 | C6: | 9.65E−04 | C20: | −1.61E−01 |
| | C21: | 8.58E−02 | C22: | 1.15E−03 | C23: | −3.03E−03 |
| | C24: | −1.78E−04 | C40: | −2.17E−04 | C41: | 2.42E−03 |
| | C42: | −2.40E−03 | C60: | −2.36E−03 | | |
| S14 | C2: | −2.64E−02 | C3: | −1.02E−02 | C4: | −7.90E−03 |
| | C5: | −2.20E−03 | C6: | 7.70E−04 | C20: | −1.11E−01 |
| | C21: | −4.63E−02 | C22: | 1.04E−02 | C23: | −3.82E−03 |
| | C24: | −1.01E−04 | C40: | 1.27E−02 | C41: | −2.64E−03 |
| | C42: | 4.33E−04 | C60: | −9.88E−05 | | |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-186982 filed Jun. 27, 2005 and No. 2005-186983 filed Jun. 27, 2005, both of which are hereby incorporated by reference herein in their entirety.

What is claimed is:

1. A zoom optical system comprising:
   a plurality of optical groups with variable optical power arranged along an optical axis; and
   at least one optical group with constant optical power arranged along the optical axis,
   wherein the system is zoomed by changing the power of at least one of the plurality of the optical groups with variable optical power, wherein the plurality of the optical groups with variable optical power each includes a rotationally asymmetric surface and each has a plurality of optical devices, which change the power within the respective optical groups by moving the respective optical devices in a direction different from the optical axis, and wherein the system at a telephoto end satisfies the condition:

|φdt|≦|φst|, where |φdt| is the absolute value of the power total sum of a plurality of the optical groups with variable optical power, and |φst| is the absolute value of the power total sum of the at least one optical group with constant optical power.

2. The system according to claim 1, wherein among a plurality of the optical groups with variable optical power, when a first optical group and a second optical group arranged adjacent to the image side of the first optical group are designated, the power of the second optical group changes from the negative to the positive during zooming from the telephoto end to a wide angle end, and wherein within an entire zooming range, a zooming position exists where the optical power of the first optical group agrees with that of the second optical group, and this zooming position is located adjacent to the wide angle end of the middle zooming position in the entire zooming range.

3. The system according to claim 1, wherein among a plurality of the optical groups with variable optical power, when a first optical group and a second optical group arranged adjacent to the image side of the first optical group are designated, the system satisfies the condition:

|φgw|max<|φgt|min, where |φgw|max is the larger absolute power value at the wide angle end in the first and second optical groups, and |φgt|min is the smaller absolute power value at the telephoto end in the first and second optical groups.

4. The system according to claim 1, wherein among a plurality of the optical groups with variable optical power, when a first optical group and a second optical group arranged adjacent to the image side of the first optical group are designated, the system satisfies the condition:

−|φ|max≦φAB≦|φ|max, where |φ|max is the maximum absolute value of the optical power within the range of entire zooming, and φAB is the sum of the optical power of the first and second groups at an arbitrary zooming position.

5. The system according to claim 1, wherein when reference character i denotes a face number of an optical face S of the optical devices of the entire system sequentially numbered from the object side to the image side, character Ki denotes an inclination to the optical axis of the tangent at an intersection of the optical face Si and the optical axis, character Kmax represents the maximum inclination, the total sum of inclinations Ki of optical faces of the entire system is expressed by:

$$\sum_i K_i,$$

the following condition is satisfied:

$$\left|\sum_i K_i\right| < K_{max}.$$

6. The system according to claim 1, wherein the system satisfies the following condition;

0 (degree mm)≦Kmax/Δφ≦3 (degree mm), where Kmax is the maximum inclination, and Δφ is the change in optical power, which is accompanied by zooming, of an optical face of the optical device forming a plurality of the optical groups with variable optical power.

7. The system according to claim 1, further comprising a diaphragm arranged in a light path, wherein the at least one optical group with constant optical power includes an optical group immovable for zooming and having optical devices arranged from the diaphragm toward the image side in an order of the device with positive refractive power and the device with negative refractive power.

8. The system according to claim 1, wherein the system satisfies the following condition;

δ×φ<6, where φ is the optical power of at least one of the plurality of optical groups with variable optical power when a plurality of the optical devices changing the power in the at least one of the plurality of optical groups are displaced from the optical axis by δ.

9. The system according to claim 1, wherein at least one of the plurality of the optical groups with variable optical power includes an optical device with a sign condition reversed at the wide angle end.

10. The system according to claim 1, wherein among a plurality of the optical groups with variable optical power, when a first optical group and a second optical group arranged adjacent to the image side of the first optical group are designated, at the wide angle end, the first optical group includes an optical device with positive refractive power and an optical device with negative refractive power sequentially arranged from the object side toward the image side, and the second optical group includes an optical device with positive refractive power and an optical device with negative refractive power sequentially arranged from the object side toward the image side.

11. The system according to claim 1, wherein among a plurality of the optical groups with variable optical power, when a first optical group and a second optical group arranged adjacent to the image side of the first optical group are designated, at the telephoto end, the first optical group includes an optical device with positive refractive power and an optical device with positive refractive power sequentially arranged from the object side toward the image side, and the second optical group includes an optical device with negative refractive power and an optical device with negative refractive power sequentially arranged from the object side toward the image side.

12. The system according to claim 1, further comprising a photoelectric transducer, on which images are formed.

13. An image-pickup apparatus comprising:

a zoom optical system; and a photoelectric transducer for receiving the image formed by the zoom optical system, the zoom optical system including a plurality of optical groups with variable optical power arranged along an optical axis and at least one optical group with constant optical power arranged along the optical axis, wherein the system is zoomed by changing the power of at least one of the plurality of the optical groups with variable optical power, wherein the plurality of the optical groups with variable optical power each includes a rotationally asymmetric surface and each has a plurality of optical devices, which change the power within the respective optical groups by moving the respective optical devices in a direction different from the optical axis, and wherein the system at a telephoto end satisfies the condition:

$|\phi dt| \leq |\phi st|$ where $|\phi dt|$ is the absolute value of the power total sum of a plurality of the optical groups with variable optical power, and $|\phi st|$ is the absolute value of the power total sum of the at least one optical group with constant optical power.

* * * * *